United States Patent
Kawaguchi et al.

(10) Patent No.: US 9,262,674 B2
(45) Date of Patent: Feb. 16, 2016

(54) ORIENTATION STATE ESTIMATION DEVICE AND ORIENTATION STATE ESTIMATION METHOD

(75) Inventors: Kyoko Kawaguchi, Tokyo (JP); Masamoto Tanabiki, Kanagawa (JP); Kensuke Maruya, Osaka (JP); Yuji Sato, Tokyo (JP); Mitsuko Fujita, Tokyo (JP)

(73) Assignee: PANASONIC CORPORATION, Osaka (JP)

( * ) Notice: Subject to any disclaimer, the term of this patent is extended or adjusted under 35 U.S.C. 154(b) by 179 days.

(21) Appl. No.: 13/991,021

(22) PCT Filed: Nov. 22, 2011

(86) PCT No.: PCT/JP2011/006499
§ 371 (c)(1),
(2), (4) Date: May 31, 2013

(87) PCT Pub. No.: WO2012/077287
PCT Pub. Date: Jun. 14, 2012

(65) Prior Publication Data
US 2013/0301882 A1   Nov. 14, 2013

(30) Foreign Application Priority Data
Dec. 9, 2010   (JP) .................. 2010-274673

(51) Int. Cl.
*G06K 9/00* (2006.01)
*G06T 7/00* (2006.01)

(52) U.S. Cl.
CPC .......... *G06K 9/00335* (2013.01); *G06T 7/0048* (2013.01); *G06T 2207/30164* (2013.01)

(58) Field of Classification Search
CPC ........... G06K 9/00362; G06K 9/00335; G06T 2207/30164
See application file for complete search history.

(56) References Cited

U.S. PATENT DOCUMENTS

| 2005/0213818 A1* | 9/2005 | Suzuki et al. ........ G06K 9/4609 382/190 |
| 2006/0115116 A1* | 6/2006 | Iwasaki et al. ..... G06K 9/00348 382/103 |

(Continued)

FOREIGN PATENT DOCUMENTS

| CN | 1698067 A | 11/2005 |
| CN | 1839409 A | 9/2006 |

(Continued)

OTHER PUBLICATIONS

Search Report for Chinese Application No. 201180054681.4 dated Jan. 7, 2015.

(Continued)

*Primary Examiner* — Amara Abdi
(74) *Attorney, Agent, or Firm* — Pearne & Gordon LLP

(57) ABSTRACT

Disclosed is an orientation state estimation device capable of estimating with high accuracy the orientation state of a jointed body. An orientation state estimation device (100) estimates the orientation state of a body on the basis of image data of the body having multiple parts connected by joints. The device is provided with: a likelihood map generation unit (150) which, from the image data, for at least two parts of the jointed body, generates a likelihood map showing the plausibility distribution of where each part is most plausibly positioned; and an orientation state estimation unit (160) which, when a learning likelihood map, which is associated in advance with an orientation state, and an estimated likelihood map, which is generated on the basis of the image data, coincide to a high degree, estimates that the orientation state associated with said learning likelihood map is the orientation state of the object.

6 Claims, 24 Drawing Sheets

(56) References Cited

U.S. PATENT DOCUMENTS

| | | | |
|---|---|---|---|
| 2006/0273800 A1* | 12/2006 | Horning et al. | 324/426 |
| 2006/0279800 A1* | 12/2006 | Fukui et al. | H04N 1/387 358/453 |
| 2007/0268295 A1* | 11/2007 | Okada | G06K 9/00369 345/474 |
| 2008/0112592 A1* | 5/2008 | Wu et al. | A61B 5/1113 382/103 |
| 2008/0152191 A1 | 6/2008 | Fujimura et al. | |
| 2009/0326713 A1* | 12/2009 | Moriya | A63H 17/00 700/255 |
| 2011/0085704 A1* | 4/2011 | Han et al. | G06T 7/20 382/103 |

FOREIGN PATENT DOCUMENTS

| | | | | |
|---|---|---|---|---|
| CN | 101093582 A | | 12/2007 | |
| JP | 08-214289 | * | 8/1996 | H04N 7/18 |
| JP | 08-214289 A | | 8/1996 | |
| JP | 2005-242759 A | | 9/2005 | |
| JP | 2005-351814 A | | 12/2005 | |
| JP | 2007-004732 A | | 1/2007 | |
| JP | 2007-310707 A | | 11/2007 | |
| JP | 2009-288917 A | | 12/2009 | |
| JP | 2010-514064 A | | 4/2010 | |

OTHER PUBLICATIONS

Masamichi Shimosaka, Makoto Sato, Taketoshi Mori, and Tomomasa Sato, "Motion Recognition Using Shape Features in Monocular Images," in the collection of presentation papers from the 70th National Convention in 2008 (5), Information Processing Society of Japan, Mar. 13, 2008, p. 5-93, p. 5-94.

P. Viola and M. Jones, "Rapid Object Detection Using a Boosted Cascade of Simple Features," in Proc. of CVPR, vol. 1, Dec. 2001, pp. 511-518.

International Search Report for PCT/JP2011/006499 dated Jan. 24, 2012.

* cited by examiner

| IDENTIFIER | PROJECTION ANGLE | COORDINATES OF LEFT SHOULDER POSITION | COORDINATES OF GEOMETRIC CENTER POSITION OF HEAD | ORIENTATION OF REFERENCE PART (DEGREES) |
|---|---|---|---|---|
| 1 | 45 | 1, 0 | $0.5, \frac{1}{2\sqrt{3}}$ | 0, 0, 0 |
| 2 | 45 | $\frac{1}{\sqrt{2}}, -\frac{1}{\sqrt{2}}$ | 0.3, 1.2 | 0, 45, 0 |
| ... | ... | ... | ... | ... |

FIG. 10

| IDENTIFIER | PROJECTION ANGLE | HEAD-SHOULDER REGION POSITION (RIGHT SHOULDER POSITION IN IMAGE) | HEAD-SHOULDER REGION ORIENTATION (ANGLE) | RIGHT UPPER ARM (CENTER COORDINATES AND RADIUS) | LEFT UPPER ARM (CENTER COORDINATES AND RADIUS) | ... |
|---|---|---|---|---|---|---|
| 1 | 45 | 300, 250 | 0, 0, 0 | 300, 250, 100 | 350, 250, 100 | ... |
| 2 | 45 | 300, 250 | 0, 45, 0 | ... | ... | ... |
| ... | ... | ... | ... | ... | ... | ... |

FIG. 11

ORIENTATION STATE ESTIMATION DEVICE AND ORIENTATION STATE ESTIMATION METHOD

TECHNICAL FIELD

The present invention relates to a posture state estimation apparatus and a posture state estimation method that estimate the posture state of an object including a plurality of parts articulated by joints on the basis of image data obtained by capturing the object.

BACKGROUND ART

Human posture estimation based on image data from a captured video sequence has been an active area of research in recent years. This is because being able to determine human behavior based on videos through computer analysis would make behavior analysis, which is performed in various fields, possible without requiring human effort. Examples of behavior analysis include abnormal behavior detection on the streets, purchasing behavior analysis in stores, factory streamlining support, and form coaching in sports.

In this respect, NPL 1, for example, discloses a technique for estimating the posture state of a person based on image data captured with a monocular camera. In the technique disclosed in NPL 1 (hereinafter referred to as "related art"), the silhouette (outline) of a person is detected from image data, and a shape context histogram that is one of shape features is extracted from the detected silhouette. In the related art, a classifier is formed for each posture of an operation to be classified, with a variance-covariance matrix of the extracted histogram being as input. With this configuration, the related art can estimate the posture state of the person regardless of the position and orientation of the person.

CITATION LIST

Non-Patent Literature

NPL 1
Masamichi Shimosaka, Makoto Sato, Taketoshi Mori, and Tomomasa Sato, "Motion Recognition Using Shape Features in Monocular Images," in the collection of presentation papers from the 70$^{th}$ National Convention in 2008 (5), Information Processing Society of Japan, Mar. 13, 2008, p. 5-93, p. 5-94

NPL 2
P. Viola and M. Jones, "Rapid Object Detection Using a Boosted Cascade of Simple Features." in Proc. of CVPR, vol. 1, December, 2001, ppp. 511-518

SUMMARY OF INVENTION

Technical Problem

However, the related art cannot distinguish between a plurality of posture states having similar silhouettes, and thus has a problem in that the posture states of persons cannot be estimated accurately. By way of example, let us suppose a case where both arms of a person are covered by the outline of his/her torso as viewed from a camera. In this case, according to the related art, if the entire outline including the outlines of his/her head and legs is the same, the same posture state is obtained as the estimation result, regardless of whether the arms are bent or stretched and whether the arms are located in front or in back.

While the posture states of various objects, besides humans, having a plurality of parts articulated by joints (e.g., robots) could be estimated using the related art, similar problems could still arise in such cases.

An object of the present invention is to provide a posture state estimation apparatus and a posture state estimation method capable of accurately estimating the posture state of an object having joints.

Solution to Problem

A posture state estimation apparatus according to an aspect of the present invention estimates a posture state of an object including a plurality of parts articulated by joints on a basis of image data obtained by capturing the object, the apparatus including: a likelihood map generation section that generates, for at least two of the parts, a likelihood map indicating a distribution of likelihood that each part is located, from the image data; and a posture state estimation section that estimates, if a level of match between a learned likelihood map and an estimated likelihood map is high, the posture state associated with the learned likelihood map, as the posture state of the object, the learned likelihood map being the likelihood map associated in advance with the posture state, the estimated likelihood map being the likelihood map generated on the basis of the image data.

A posture state estimation method according to an aspect of the present invention estimates a posture state of an object including a plurality of parts articulated by joints on a basis of image data obtained by capturing the object, the method including: generating, for at least two of the parts, a likelihood map indicating a distribution of likelihood that each part is located, from the image data; determining a level of match between a learned likelihood map that is the likelihood map associated in advance with the posture state and an estimated likelihood map that is the likelihood map generated on the basis of the image data; and estimating, if the level of match is high, the posture state associated with the learned likelihood map as the posture state of the object.

Advantageous Effects of Invention

With the present invention, the posture state of an object having joints can be estimated accurately.

BRIEF DESCRIPTION OF DRAWINGS

FIG. 10 is a diagram showing example contents of a reference part correspondence table in Embodiment 1;

FIG. 11 is a diagram showing example contents of a part region correspondence table in Embodiment 1;

FIGS. 16A to 16F each show another example of the case where it is determined to be the designated posture according to Embodiment 1;

DESCRIPTION OF EMBODIMENTS

Embodiments of the present invention will be described in detail below with reference to the drawings.

Embodiment 1

Embodiment 1 of the present invention is an example in which the present invention is applied to an apparatus that estimates whether or not the posture state of a captured person matches with a posture state designated by a user.

In the description below, the term "part" refers to one unit among portions of the human anatomy divided by joints. In other words, the term part may refer to, for example, the head, the shoulders, the right upper arm, the right forearm, the left upper arm, the left forearm, the right thigh, the right crus, the left thigh, or the left crus. Further, the term "part region" refers to a region that could be occupied by a given part within an image, i.e., the range of motion of a part.

The term "posture state" as the estimation target refers to the postures of two or more parts to be focused on (hereinafter referred to as "parts of interest"). "Posture" in this context may be represented by such information as the position of a joint that articulates the parts of interest in a two-dimensional coordinate system or three-dimensional coordinate system, the lengths of the parts concerned, the angle formed between the parts, and the like. Accordingly, the term "posture state estimation" involves estimating a posture state by estimating such information. The positions, lengths, and angles mentioned above may be expressed through relative values that reference a predetermined human body part, or through absolute values in a two-dimensional coordinate system or three-dimensional coordinate system.

Although descriptions are provided using pixels as basic units for the present embodiments, similar processes may also be performed by treating a group of pixels equivalent to a predetermined size as one pixel. This would enable carrying out high-speed processing. When treating a plurality of pixels as one pixel, the value of the pixel that is the geometric center of the plurality of pixels may be used as the value of the plurality of pixels, or the average value of the values of the plurality of pixels may be used as the value of the plurality of pixels.

Figure 1:
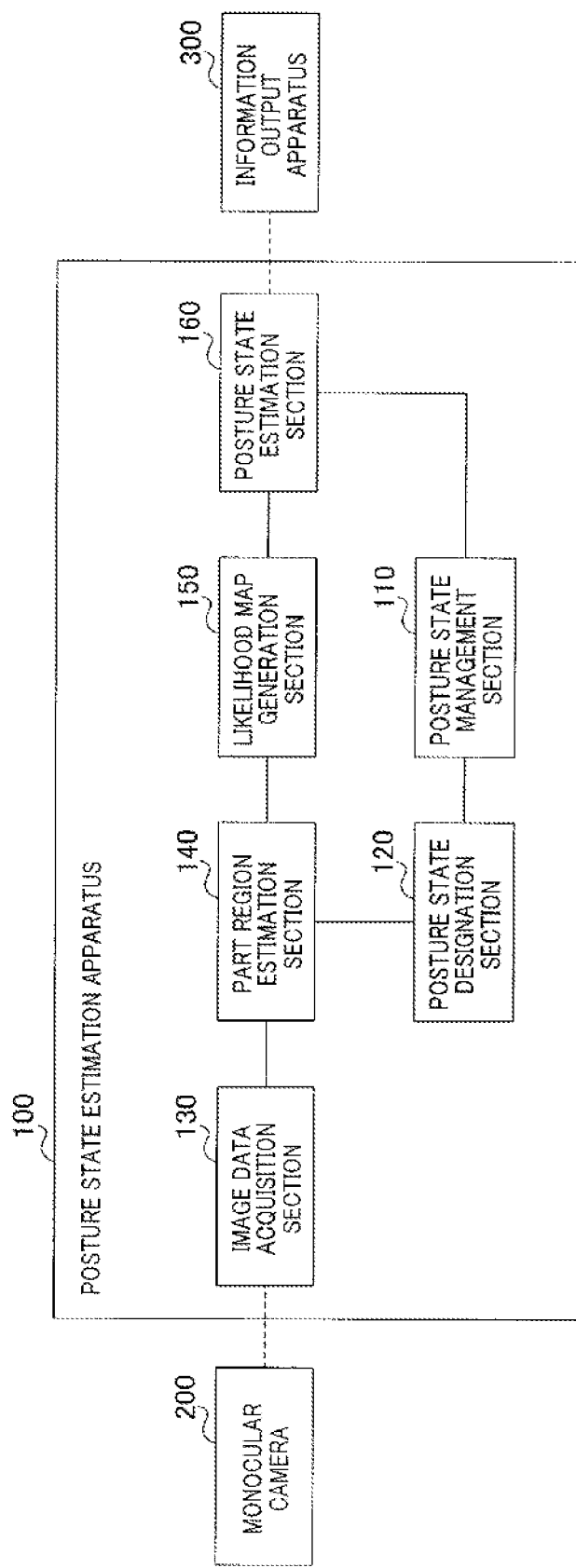
FIG. 1 is a block diagram showing a configuration example of a posture state estimation apparatus according to Embodiment 1 of the present invention.

FIG. 1 is a block diagram showing a configuration example of a posture state estimation apparatus according to Embodiment 1 of the present invention. For ease of description, peripheral devices of the posture state estimation apparatus are also shown in the drawing.

In FIG. 1, posture state estimation apparatus 100 includes posture state management section 110, posture state designation section 120, image data acquisition section 130, part region estimation section 140, likelihood map generation section 150, and posture state estimation section 160.

Posture state management section 110 stores in advance, for each posture state, identification information of the posture state, identification information of two or more parts of interest designated to the posture state, and a likelihood map in association with one another. The likelihood map indicates a distribution of the likelihood that each part of interest is located in an image, and details thereof will be described later. Only the posture states whose information is stored in posture state management section 110 are hereinafter referred to as "posture states." The likelihood map that is stored in advance in posture state management section 110 in association with a posture state is hereinafter referred to as "learned likelihood map."

Posture state designation section 120 receives the designation of a posture state as the estimation target from a user through an input apparatus (not shown) such as a keyboard. Specifically, posture state designation section 120 creates, for example, a list of posture states with reference to posture state management section 110, then displays the created list as options, and thereby receives the designation of a posture state. Posture state designation section 120 receives, for example, the designation of a posture state where "the right arm is bent." Then, posture state designation section 120 outputs identification information of the designated posture state to part region estimation section 140 and posture state management section 110. The designated posture state and identification information of the designated posture are hereinafter collectively referred to as "designated posture."

Posture state designation section 120 outputs the two or more parts of interest associated with the designated posture to part region estimation section 140. For example, with respect to the posture state where "the right arm is bent," posture state designation section 120 outputs the "right upper arm" and the "right forearm." The parts of interest associated with the designated posture are hereinafter referred to as "designated parts."

Image data acquisition section 130 obtains, by wire or wirelessly, image data of an image captured by monocular camera 200 installed in a predetermined three-dimensional coordinate space, and outputs the image data to part region estimation section 140. In the following description, it is assumed that the image data contains images of one person only. However, this is by no means limiting, and it may contain images of a plurality of people, or of none at all.

Figure 2:
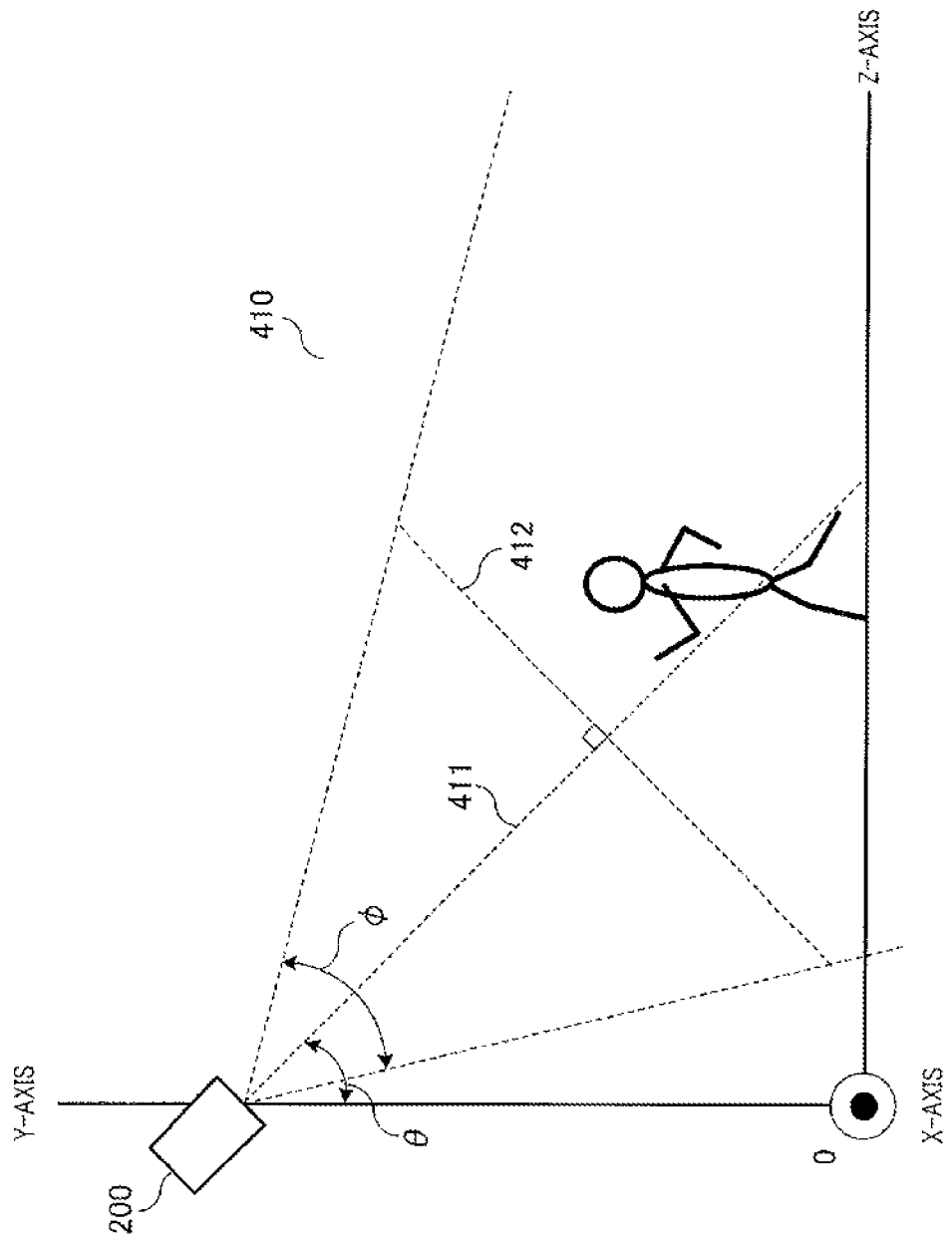
FIG. 2 is a diagram illustrating image data in Embodiment 1.

FIG. 2 is a diagram illustrating image data.

Three-dimensional coordinate system 410 is set up as shown in FIG. 2, where the position of monocular camera 200 as projected onto the ground is taken to be origin O, for example. Coordinate system 410 takes the perpendicular direction to be the Y-axis, a direction orthogonal to the Y-axis and optical axis 411 of monocular camera 200 to be the X-axis, and a direction orthogonal to the X-axis and the Y-axis to be the Z-axis, for example.

The installation angle of monocular camera 200 is denoted by angle θ formed between the Y-axis and optical axis 411, for example. Monocular camera 200 performs imaging by focusing on plane 412 contained in the range within view angle φ of monocular camera 200. Image data of the image thus captured is sent to posture state estimation apparatus 100. The image data as the estimation target of the posture state is hereinafter referred to as "estimated image data."

Part region estimation section 140 in FIG. 1 estimates the part region of each designated part received from posture state designation section 120, on the basis of the estimated image data received from image data acquisition section 130. Specifically, part region estimation section 140 estimates the positions and orientations of reference parts of a person, from the estimated image data. Then, with the estimated positions and orientations of the reference parts as the references, part region estimation section 140 estimates the part region of each designated part.

For the present embodiment, it is assumed that the reference parts include the head and shoulders of a person. It is assumed that the orientation of the reference parts is the orientation of the shoulders, where the orientation of the shoulders is defined as the direction of a straight line connecting the right shoulder and the left shoulder. Then, part region estimation section 140 outputs the estimated image data, the designated posture, and information indicating the part region of each designated part (hereinafter referred to as "part region data") to likelihood map generation section 150.

Likelihood map generation section 150 generates a likelihood map from the estimated image data received from part region estimation section 140. At this time, likelihood map generation section 150 generates a likelihood map where, for regions other than the part regions indicated by the part region data received from part region estimation section 140, the likelihood that designated parts corresponding to those part regions are located thereat is set low. The likelihood map thus generated contains such information that only the likelihood of the ranges of motion of the parts of interest in the designated posture (for example, the "right upper arm" and the "right forearm" in the case of the posture state where "the right arm is bent") is high. Then, likelihood map generation section 150 outputs the generated likelihood map to posture state estimation section 160 together with the designated posture received from part region estimation section 140. The likelihood map generated on the basis of the estimated image data is hereinafter referred to as "estimated likelihood map."

Posture state estimation section 160 acquires a learned likelihood map associated with the designated posture received from likelihood map generation section 150, from posture state management section 110. Note that posture state management section 110 may output the learned likelihood map to posture state estimation section 160 upon reception of an instruction from posture state estimation section 160. Then, if the level of match between the acquired learned likelihood map and the estimated likelihood map received from likelihood map generation section 150 is high, posture state estimation section 160 estimates the designated posture as the posture state of the person in the estimated image data. That is, posture state estimation section 160 estimates that the person captured by monocular camera 200 is in the posture state designated by the user. Posture state estimation section 160 sends, by wire or wirelessly, information to information output apparatus 300 (e.g., a display apparatus), thus notifying the user of the estimation result.

Posture state estimation apparatus 100 may be a computer including a central processing unit (CPU), a storage medium (e.g., random-access memory (RAM)), and/or the like. In other words, posture state estimation apparatus 100 operates by having the CPU execute a stored control program.

Because posture state estimation apparatus 100 described above uses a likelihood map representing a distribution of likelihoods for each part, even if, for example, the right arm is covered by the outline of the torso in the image, it is possible to determine whether or not the posture state is "right arm is bent." That is, posture state estimation apparatus 100 can estimate the posture states of persons more accurately than the related art.

Posture state estimation apparatus 100 estimates a part region, which is a region where a specified part is movable, and sets low likelihood values for regions other than the part region, thus improving the accuracy of the likelihood map.

The operation of posture state estimation apparatus 100 will be described.

Figure 3:
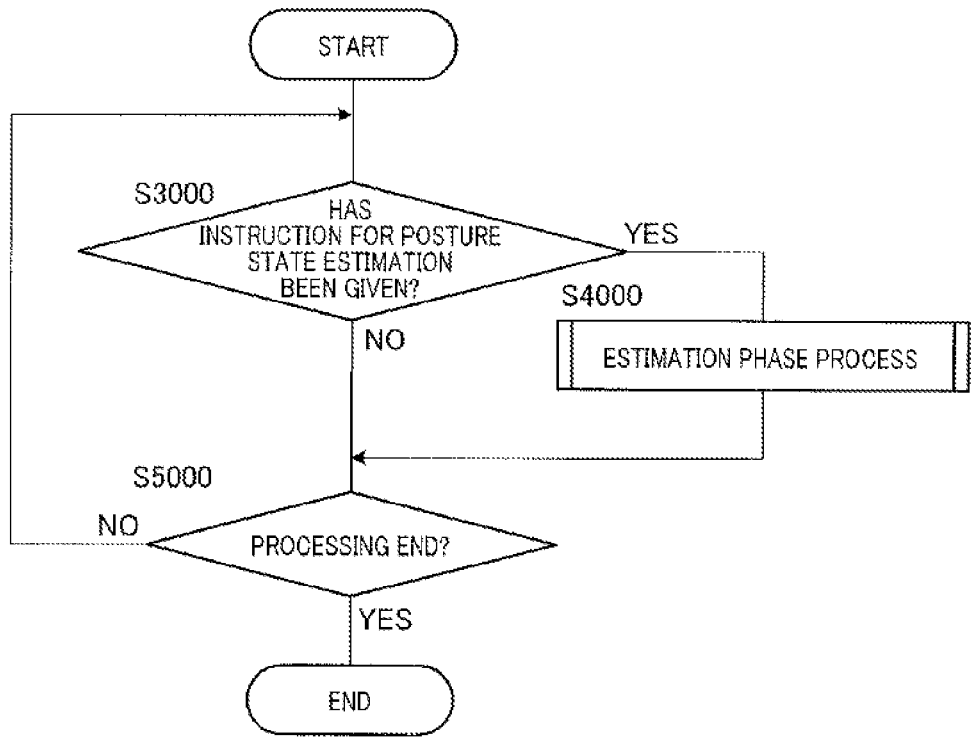
FIG. 3 is a flowchart showing an operation example of the posture state estimation apparatus according to Embodiment 1.

FIG. 3 is a flowchart showing an operation example of posture state estimation apparatus 100.

First, in step S3000, part region estimation section 140 determines whether or not an instruction for posture state estimation has been given. Part region estimation section 140 determines that an instruction for posture state estimation has been given, for example, when posture state designation section 120 receives the designation of a new posture state or when image data acquisition section 130 receives new estimated image data. If an instruction for posture state estimation has been given (S3000: YES), part region estimation section 140 proceeds to step S4000. If an instruction for posture state estimation has not been given (S3000: NO), part region estimation section 140 proceeds to step S5000.

In step S4000, posture state estimation apparatus 100 performs an estimation phase process for posture state estimation, and proceeds to step S5000. Details of the estimation phase process will be described hereinafter.

In step S5000, part region estimation section 140 determines whether or not an instruction for processing end has been given through a user operation or the like. If an instruction for processing end has not been given (S5000: NO), part region estimation section 140 returns to step S3000, and continues to stand by for an instruction for posture state estimation. If an instruction for processing end has been given (S5000: YES), part region estimation section 140 ends this process.

Figure 4:
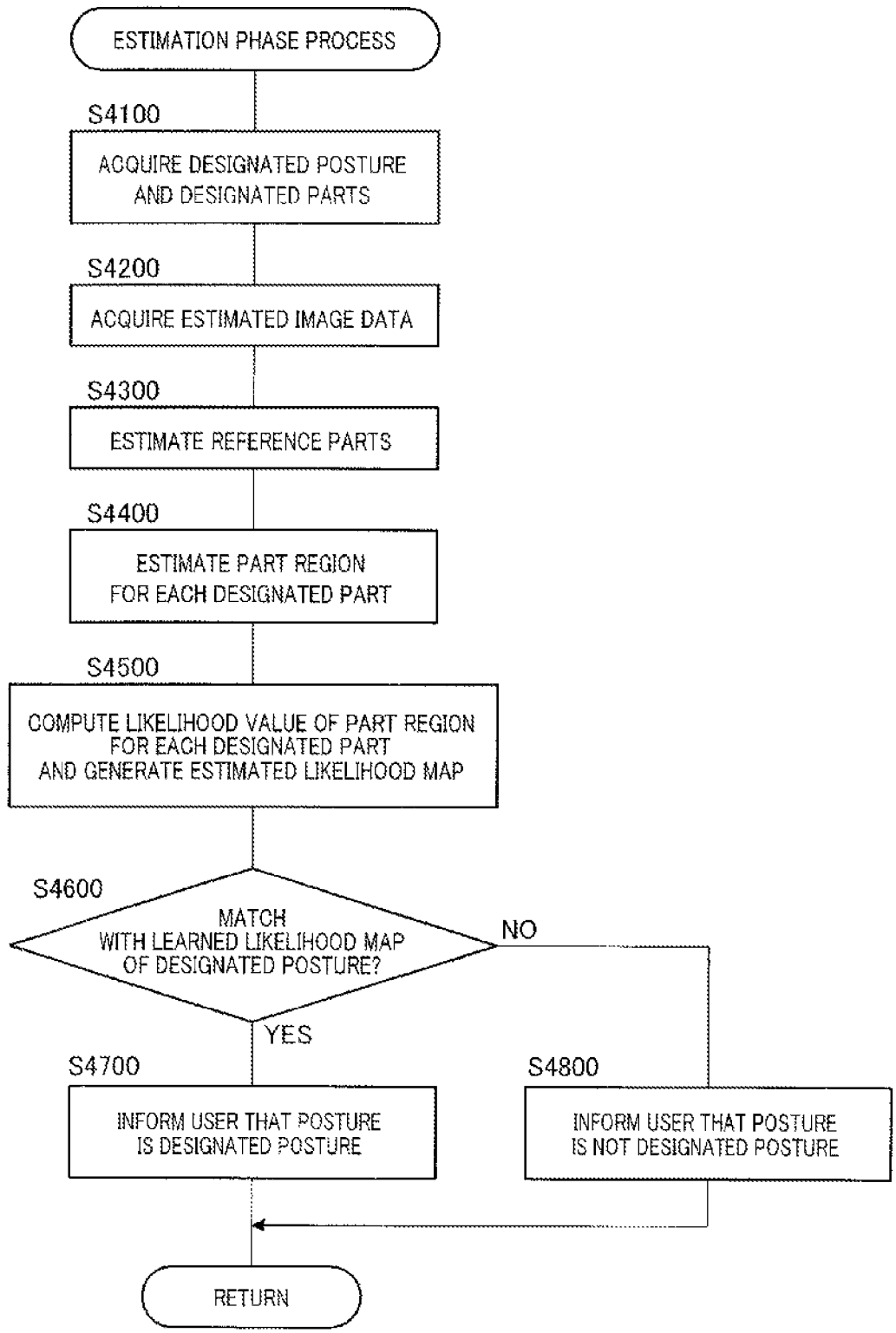
FIG. 4 is a flowchart showing an example of an estimation phase process according to Embodiment 1.

FIG. 4 is a flowchart showing an example of the estimation phase process (step S4000 in FIG. 3).

In step S4100, posture state designation section 120 receives the designation of a posture state from the user to acquire the designated posture and acquire designated parts corresponding to the designated posture.

Then, in step S4200, part region estimation section 140 acquires the estimated image data from monocular camera 200 through image data acquisition section 130. The estimated image data may be still image data forming video data that is captured continuously in real time by monocular camera 200, and may be image data captured and stored in advance.

In step S4300, part region estimation section 140 then performs a process of estimating the positions and orientation of reference parts (hereinafter referred to as "reference part estimation process").

An example of the details of the reference part estimation process will be described. Broadly speaking, the reference part estimation process includes a first process of estimating the shoulder joint positions of a person, and a second process of estimating the orientation of the torso of a person.

The first process of estimating the shoulder joint positions of a person will be described first.

Part region estimation section 140 detects an omega shape from the estimated image data, and estimates shoulder joint positions based on the omega shape.

Figure 5:
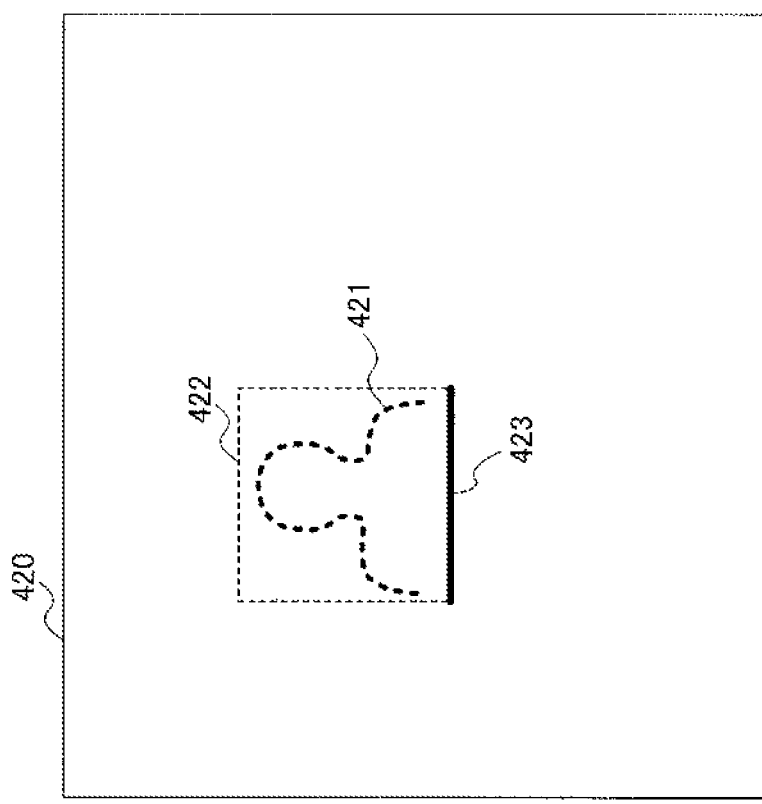
FIG. 5 is diagram illustrating an omega shape in Embodiment 1.

FIG. 5 is a diagram illustrating an omega shape.

An omega (Ω) shape is a characteristic edge shape of a region that encompasses the head and shoulders of a person, and is a shape having a high probability that, with regard to the human body, imaging would be carried out most stably when a surveillance camera or the like is used. Further, the positions of the head and shoulders relative to the torso of a person vary little. Accordingly, part region estimation section 140 first detects an omega shape to detect the positions of the head and shoulders of a person. Part region estimation section 140 then estimates part regions for other parts relative thereto, thus accurately estimating part regions.

An omega shape may be detected using a detector created with Real AdaBoost and/or the like using a sufficient number of sample images, for example. Examples of feature values used for the detector may include histogram of gradient (HtoG) feature values, Sparse feature values, Haar feature values, and/or the like. Besides boosting algorithms, other learning algorithms such as support vector machines (SVMs), neural networks, and/or the like may also be employed.

Part region estimation section 140 first detects omega shape 421 from image 420 of the estimated image data. Of the pixels in omega region 422, the pixels forming omega shape 421 (the pixels at the edge portion) are of a digital signal of "1," while the rest of the pixels are of a digital signal of "0." A relatively small rectangular region encompassing omega shape 421 is determined to be omega region 422. The base of omega region 422 is referred to as reference line 423.

Part region estimation section 140 eliminates noise contained in omega region 422. Specifically, of the pixels in omega region 422, part region estimation section 140 deems any digital signal of "1" that is present within the region enclosed by omega shape 421 to be noise and corrects it to a digital signal of "0." This correction may be done by performing a so-called closing process, for example. A closing process is a process that enlarges or reduces an image region by a predetermined number of pixels or by a predetermined proportion. Through this correction, the accuracy of the distance histogram discussed hereinafter may be improved.

Part region estimation section 140 obtains the perpendicular distance from reference line 423 to omega shape 421 at various positions along reference line 423.

Figure 6:
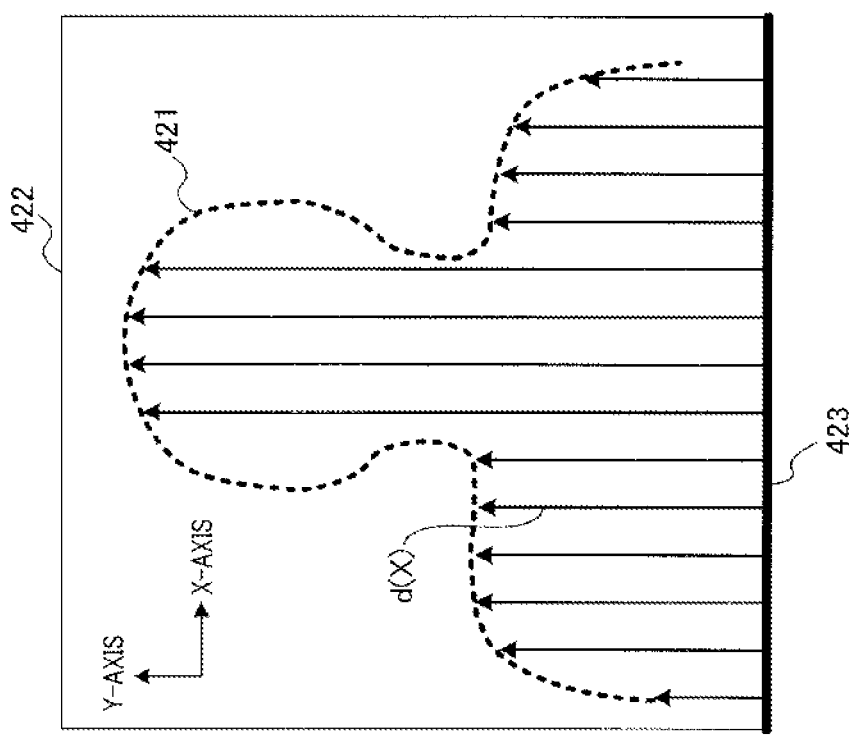
FIG. 6 is a diagram illustrating perpendicular distances from a reference line to an omega shape with in Embodiment 1.

FIG. 6 is a diagram illustrating perpendicular distances from reference line 423 to omega shape 421.

As shown in FIG. 6, part region estimation section 140 treats the direction of reference line 423 as the X-axis, and the direction perpendicular to reference line 423 as the Y-axis. Part region estimation section 140 takes the pixel count from the left end of reference line 423 to be the X-coordinate, for example. Part region estimation section 140 acquires, as perpendicular distance d(X), the pixel count in the Y-axis direction from reference line 423 to the pixel forming omega shape 421, that is, the perpendicular distance to omega shape 421.

By "the pixel forming omega shape 421," what is meant, for example, is the pixel closest to reference line 423 among pixels with a digital signal of "1."

Part region estimation section 140 generates a distance histogram where n items of perpendicular distance d(X) data are mapped to X-coordinates (where n is a positive integer).

Figure 8:
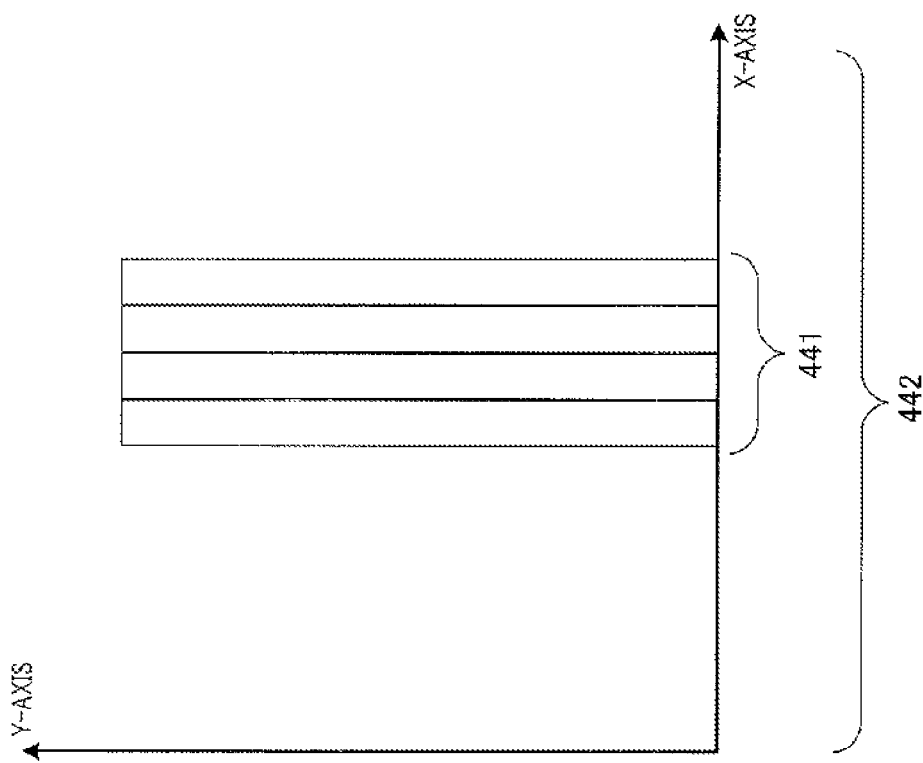
FIG. 8 is a diagram showing an example of a distance histogram after thresholding in Embodiment 1.

FIG. 8 is a diagram showing an example of a distance histogram generated by part region estimation section 140 based on omega region 422 shown in FIG. 5.

As shown in FIG. 8, in an X-Y coordinate system where the Y-axis represents perpendicular distance d(X), part region estimation section 140 generates distance histogram 430 representing a distribution of perpendicular distance d(X). Distance histogram 430 is so shaped that it rises in a shape corresponding to the shoulders, and at some point protrudes over a range corresponding to the center portion of the head.

By applying predetermined threshold Th, part region estimation section 140 performs thresholding on distance histogram 430 thus generated. Specifically, part region estimation section 140 replaces the Y-coordinates at the X-coordinates where perpendicular distance d(X) is equal to or greater than threshold Th with "1," and the Y-coordinates at the X-coordinates where perpendicular distance d(X) is less than threshold Th with "0." The value of threshold Th is so set that, in omega region 422, it would likely be greater than perpendicular distance d(X) of the upper ends of the shoulders, but less than perpendicular distance d(X) of the upper end of the head. The thresholding process is by no means limited to that above, and other methods may also be employed, one example being what is known as Otsu's thresholding (Otsu's method).

Figure 7:
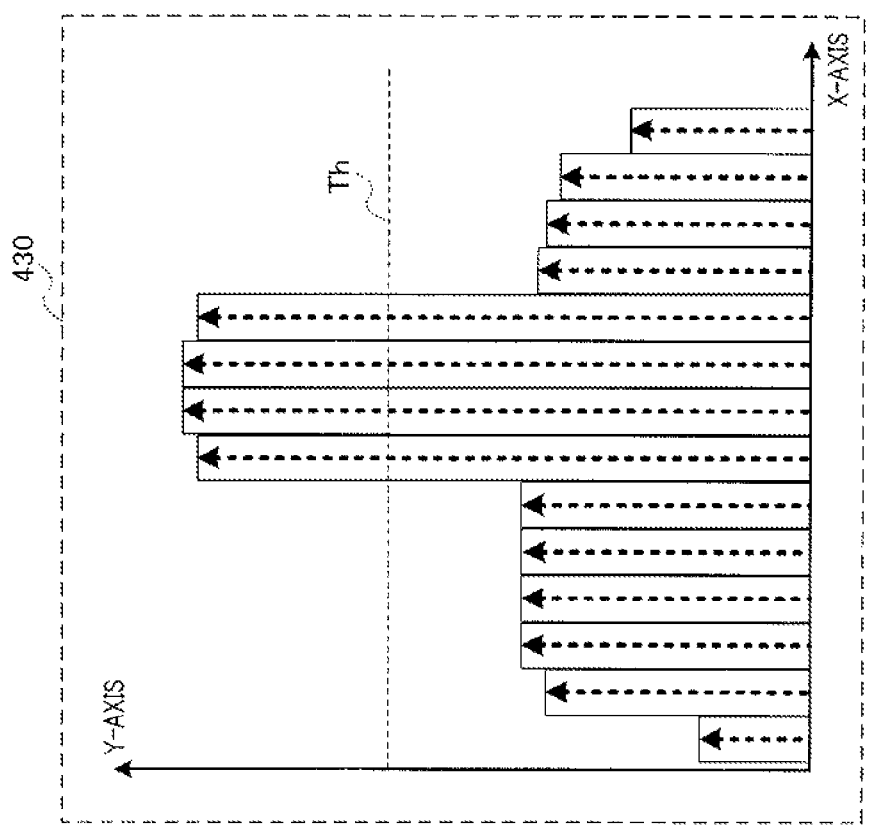
FIG. 7 is a diagram showing an example of a distance histogram in Embodiment 1.

FIG. 8 is an example of results obtained by thresholding distance histogram 430 shown in FIG. 7.

As shown in FIG. 8, range 441 of value "1" indicates the range of X-coordinates of the image region of the center portion of the head (hereinafter referred to as "head region"). Overall range 442 containing range 441 of value "1" indicates the range of X-coordinates of the image region of the shoulders (hereinafter referred to as "shoulder region"). Accordingly, from image 420 of the estimated image data, part region estimation section 140 extracts the X-axis direction range of omega region 422 as the X-axis direction range of the shoulder region, and the X-axis direction range of range 441 of value "1" as the X-axis direction range of the head region.

Based on the extracted shoulder region and head region, part region estimation section 140 computes various parameters indicating the positions and orientations of the reference parts.

Figure 9:
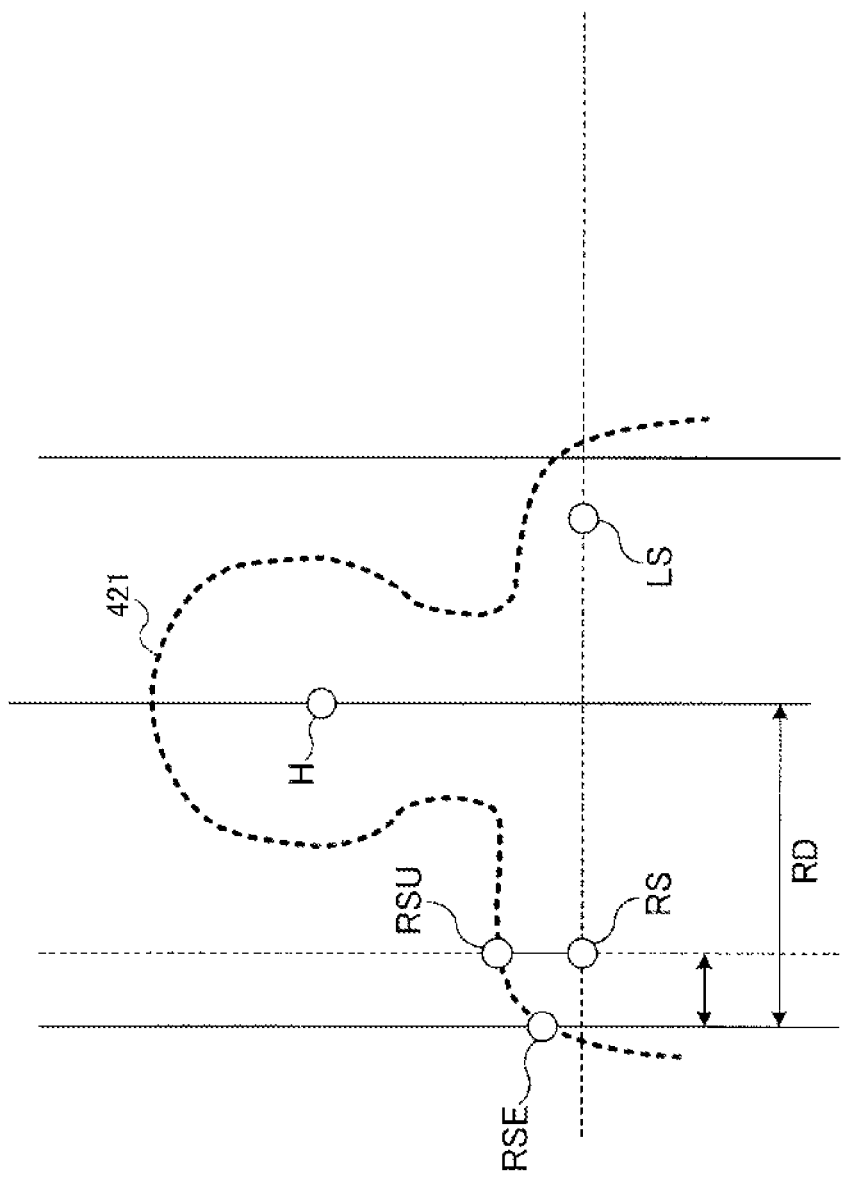
FIG. 9 is a diagram illustrating various parameters indicating reference parts in Embodiment 1.

FIG. 9 is a diagram illustrating various parameters representing the reference parts.

As shown in FIG. 9, it is assumed that part region estimation section 140 uses H(xh, yh), RSE(x_rse), RD(x_rd), RS(x_rs, y_rs), RSU(y_rsu), and LS as symbols indicating the positions of the reference parts (the contents of the parentheses indicate parameters for an X-Y coordinate system). H is the geometric center position of the head. RSE is the position of an end portion of the right shoulder. RD is the distance in the X-axis direction from the geometric center of the head to the end portion of the right shoulder. RS is the position of the right shoulder joint (hereinafter referred to as "right shoulder position"). RSU is the position of the apex of the right shoulder. LS is the position of the left shoulder joint (hereinafter referred to as "left shoulder position").

Part region estimation section 140 computes each parameter value as follows, for example.

First, based on whether or not (the torso of) the person is facing monocular camera 200, part region estimation section 140 determines the right shoulder region from among the shoulder region extracted based on the results of thresholding. Part region estimation section 140 determines whether or not the person is facing monocular camera 200 based on whether or not the skin colored components among the color information in the head region are at or above a predetermined threshold. For the case at hand, it is assumed that the person is facing monocular camera 200, and that the shoulder region on the left side of the image has been determined to be the right shoulder region.

Part region estimation section 140 next computes the geometric center position of the right shoulder region as right shoulder position RS(x_rs, y_rs). Part region estimation section 140 may also compute geometric center position H(xh, yh) of the head, and compute right shoulder position RS(x_rs, y_rs) using the distance between geometric center position H(xh, yh) and original omega shape 421 in the Y-axis direction (hereinafter referred to as "head height Δh"). Specifically, part region estimation section 140 may take a value, which is of a pre-defined ratio to head height Δh, as distance (xh−x_rs) from geometric center position H of the head to right shoulder position RS in the X-axis direction, for example. Part region estimation section 140 may also take a position that is lower than shoulder height by half the value of head height Δh, i.e., by Δh/2, to be the Y-coordinate of right shoulder position RS, i.e., y_rs, for example.

Furthermore, part region estimation section 140 computes, as position RSE(x_rse) of the end portion of the right shoulder, a point at which the edge gradient of omega shape 421 (i.e. the rate of change of the distance histogram) exceeds a threshold. Part region estimation section 140 computes distance RD(x_rd) in the X-axis direction between geometric center position H of the head and position RSE of the end portion of the right shoulder.

Finally, part region estimation section 140 estimates right shoulder position RS to be located at a position that is 80% of distance RD from geometric center position HI of the head in the X-axis direction. Specifically, part region estimation section 140 computes X-coordinate x_rs of right shoulder position RS as x_rs=x_rse+0.2×RD. Part region estimation section 140 computes, as position RSU(y_rsu) of the apex of the right shoulder, the point of intersection between a straight perpendicular line that passes through right shoulder position RS (a straight line parallel to the Y-axis) and the edge of omega shape 421. Part region estimation section 140 computes Y-coordinate y_rs of right shoulder position RS as y_rs=y_rsu−0.2×RD.

Part region estimation section 140 carries out similar computations with respect to left shoulder position LS as well. The computation methods for the various parameters are by no means limited to the examples provided above.

The second process of estimating the orientation of the torso of a person will be described.

Part region estimation section 140 pre-stores a reference part correspondence table. The reference part correspondence table is a table that maps combinations of geometric center position H of the head, right shoulder position RS, and left shoulder position LS (hereinafter referred to as "positions of the reference parts") to the respective body orientations that can be estimated from the positions of the reference parts (hereinafter referred to as "orientations of the reference parts"). In other words, the reference part correspondence table is a table that defines relative positional relationships of various parts. The term "reference parts" refers to the omega-shaped portion indicating the head and shoulders of a person as discussed above. Accordingly, the orientation of the reference parts is the orientation of the body (torso) of a person.

Part region estimation section 140 derives from the reference part correspondence table the orientation of the reference parts corresponding to the positions of the reference parts computed bused on the estimated image data.

It is preferable that the positions of the reference parts included in the stored reference part correspondence table, as well as the positions of the reference parts computed by part region estimation section 140 based on the estimated image data be normalized values independent of the size of the person on the screen. Specifically, part region estimation section 140 derives the orientation of the reference parts using values normalized in such a manner that, with geometric center position H of the head as the origin, the distance between geometric center position H of the head and right shoulder position RS or left shoulder position LS would be 1, for example.

The reference part correspondence table may also include right shoulder position RS and left shoulder position LS. The reference part correspondence table may also include the angle formed between a line passing through geometric center position H of the head and right shoulder position RS or left shoulder position LS and a straight perpendicular line passing through geometric center position H of the head (hereinafter referred to as "head perpendicular line"). The reference part correspondence table may also include the distance between geometric center position H of the head and left shoulder position LS relative to the distance between geometric center position H of the head and right shoulder position RS, where the latter distance is defined as being 1. Part region estimation section 140 derives the orientation of the reference parts by computing parameters corresponding to the parameters included in the reference part correspondence table.

FIG. 10 is a diagram showing example contents of a reference part correspondence table.

As shown in FIG. 10, reference part correspondence table 450 includes projection angle 452, coordinates 453 of left shoulder position LS, coordinates 454 of geometric center position H of the head, and reference part orientation 455, which are mapped to identifier 451. The various coordinates are expressed using a predetermined two-dimensional coordinate system parallel to the two-dimensional coordinate system of the screen, where right shoulder position RS is taken to be the origin, for example. Projection angle 452 is the angle of this predetermined two-dimensional coordinate system relative to the X-Z plane of three-dimensional coordinate system 410 described in connection with FIG. 2 (i.e., installation angle θ shown in FIG. 2), for example. Reference part orientation 455 is expressed as rotation angles relative to the X-, Y-, and Z-axes of three-dimensional coordinate system 410 described in connection with FIG. 2, for example.

Part region estimation section 140 thus estimates the positions and orientation of the reference parts. This concludes this description of a reference part estimation process.

Next, in step S4400 in FIG. 4, part region estimation section 140 performs a process of estimating a part region for each designated part (hereinafter referred to as "part region estimation process") based on the estimated positions and orientation of the reference parts.

An example of the details of the part region estimation process will be described.

Part region estimation section 140 pre-stores a part region correspondence table. The part region correspondence table is a table that maps the positions and orientation of the reference parts to part regions of other parts.

Part region estimation section 140 derives from the part region correspondence table a part region of a designated part corresponding to the positions and orientation of the reference parts estimated from the estimated image data.

Part regions may be defined in terms of pixel positions in the image of the estimated image data, for example. Accordingly, with respect to all pixels in the entire image of the estimated image data, part region estimation section 140 determines which designated part's part region each pixel belongs to.

FIG. 11 is a diagram showing example contents of a part region correspondence table.

As shown in FIG. 11, part region correspondence table 460 includes head-shoulder region (reference parts) position 463, head-shoulder region (reference parts) orientation 464, and region 465 of each part, which are mapped to identifier 461. Each position and region is represented by values of a two-dimensional coordinate system for the image, for example. Projection angle 462 is the angle of this predetermined two-dimensional coordinate system relative to the X-Z plane of three-dimensional coordinate system 410 described in connection with FIG. 2 (i.e., installation angle θ shown in FIG. 2), for example. Head-shoulder region position 463 is right shoulder position RS, for example. Head-shoulder region orientation 464 is expressed as rotation angles relative to the X-, Y-, and Z-axes of three-dimensional coordinate system 410 described in connection with FIG. 2, for example. If identifier 461 is the same as identifier 451 in reference part correspondence table 450, head-shoulder region orientation 464 does not necessarily have to be included in part region correspondence table 460. Region 465 of each part is expressed in terms of the center coordinates and radius of a circle, assuming that the region can be approximated by a circle, for example.

Part region estimation section 140 does not necessarily have to use part region correspondence table 460 at the time of obtaining part regions. For example, on the basis of the orientations of reference parts derived from reference part correspondence table 450 (see FIG. 10), part region estimation section 140 may dynamically compute each part region using various other pieces of body constraint information, for example, in order of increasing distance from the reference parts. The body constraint information is information containing constraint conditions regarding the position of each part.

Part region estimation section 140 then outputs as part region data to likelihood map generation section 150, with respect to all pixels of the entire image of the estimated image data, information indicating whether or not each pixel is a part region for a designated part.

The part region data may have a structure where there is laid out, for example, pixel information Kij indicating, with respect to all pixel positions (i, j) in the estimated image data, whether or not there is a corresponding part region of a designated part. Each element in pixel information Kij may, for example, assume a value of "1" if it belongs to a part region of a corresponding designated part, or "0" if not. For pixel information Kij, there are as many dimensions as there are designated parts, for example, as in Kij=[k1, k2]. In this case, k1 may correspond to the part region of the right upper arm, and k2 to the part region of the right forearm.

By way of example, if part region estimation section 140 determines that some pixel position Kab is included in the part region of the right upper arm but not in the part region of the right forearm, pixel information Kab=[1, 0] is generated. Part region estimation section 140 generates as part region data the thus generated set of pixel information for each pixel.

How part regions are to be represented by part region data is by no means limited to the example provided above. By way of example, part region data may indicate, for each part region pre-defined in the image, which designated part's part region it corresponds to, or it may indicate, for each designated part, the coordinates of the perimeter of the part region.

If normalized reference part positions are to be used in the reference part estimation process, it is preferable that the part region correspondence table include a part region corresponding to the normalized reference parts. As in the case of the reference part correspondence table discussed hereinabove, part region data may also include other information such as right shoulder position RS, left shoulder position LS, and/or the like. Part region estimation section 140 derives the part region of each designated part by computing parameters corresponding to the parameters included in the part region correspondence table.

Figure 12:
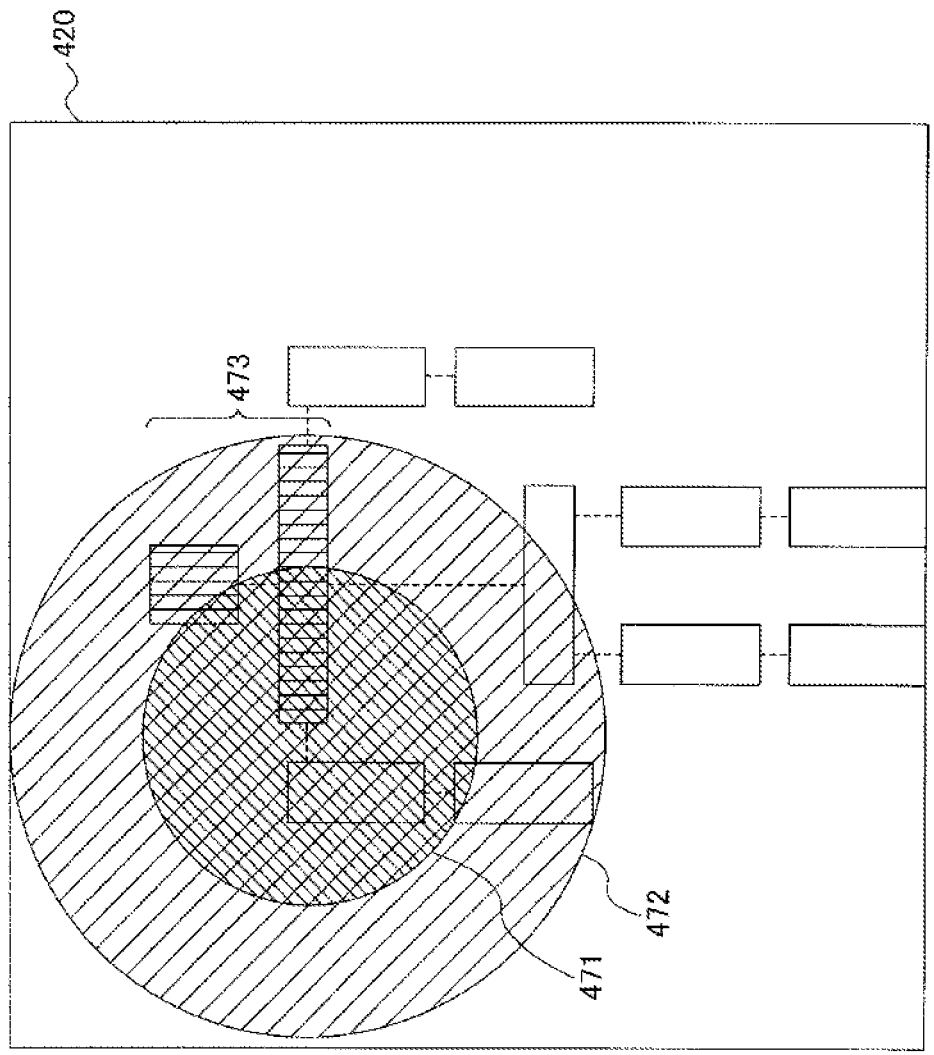
FIG. 12 is a diagram showing example contents of part region data in Embodiment 1.

FIG. 12 is a diagram showing example contents of part region data. For purposes of convenience, the position of each part with respect to a case of an upright standing state is also shown in the drawing.

As shown in FIG. 12, the part region data indicates, with respect to image 420 of the estimated image data, part region 471 of the right upper arm which is a designated part, and part region 472 of the right forearm which is a designated part. These part regions 471 and 472 are estimated with reference to the already estimated positions and orientation of reference parts 473 as mentioned above.

Part region estimation section 140 thus estimates the part region of each designated part. This concludes this description of a part region estimation process.

Next, in step S4500 in FIG. 4, likelihood map generation section 150 performs a process of computing a likelihood value with respect to the part region of each designated part and thus generating an estimated likelihood map (hereinafter referred to as "estimated likelihood map generation process").

An example of the details of an estimated likelihood map generation process will be described.

Likelihood map generation section 150 first identifies, from the estimated image data and for each pixel within the part region of each designated part, image features suited for representing the position and orientation states of the designated part, and computes a likelihood value indicating the likelihood that the designated part is located thereat. Likelihood map generation section 150 then generates an estimated likelihood map indicating a distribution of likelihood values for the pixels using the likelihood values computed from the estimated image data. The likelihood values may be values normalized to fall within the range of 0 to 1, as well as real numbers including positive integers and negative numbers.

For the method of recognizing an object of interest within the image, one may employ a technique involving: creating strong classifiers by combining the sums of a plurality of weak classifiers based on rectangular information through AdaBoost; combining the strong classifiers in a cascade; and recognizing a face as an object of interest within the image, for example. For the image features, scale-invariant feature transform (SIFT) features may be employed (e.g., see NPL 2), for example. SIFT features are configured with 128-dimensional vectors, and are values that are computed for each pixel. Because SIFT features are unaffected by scale changes, rotation, or translation of the object to be detected, they are particularly effective for detecting parts that are rotatable in various directions, e.g., the arms. In other words, SIFT features are suited for the present embodiment which defines posture states through the relative joint positions and angles of two or more parts of interest.

When a method using SIFT features is applied to the present embodiment, strong classifiers Hk (where k=1, 2) are generated for each part region in advance through machine learning, and stored in likelihood map generation section 150, as in right upper arm (k=1), right forearm (k=2), and so forth. Classifiers Hk are generated by an AdaBoost algorithm. In other words, strong classifiers Hk are generated by: repeating learning until it is made possible to determine, with the desired level of accuracy, whether or not a plurality of training images prepared in advance for each part are the right upper arm and whether or not they are the right forearm; and connecting a plurality of weak classifiers in a cascade.

Upon computing an image feature for each designated part and each pixel, likelihood map generation section 150 inputs the image features to strong classifiers Hk, and computes the sum of values obtained by multiplying the output of each weak classifier forming the strong classifiers Hk by reliability a pre-obtained for each weak classifier. Likelihood map generation section 150 then subtracts predetermined threshold Th from the computed sum to compute likelihood value ck for each designated part and each pixel. For the present case, c1 represents a likelihood value for the right upper arm, and c2 a likelihood value for the right forearm.

Likelihood map generation section 150 expresses likelihood values Cij of the respective pixels, where the likelihood values of the respective designated parts are combined, as Cij=[c1, c2]. Likelihood map generation section 150 then outputs to posture state estimation section 160 as an estimated likelihood map the likelihood values Cij of all the pixels in the entire image.

For each pixel, likelihood map generation section 150 determines whether or not the pixel is included in any part region. If it is included, a likelihood value is computed using the classifier for that part, and if not, the likelihood value for that part may be set to 0. In other words, likelihood map generation section 150 may compute the products of determinant (Kij) of pixel information outputted from part region estimation section 140 and determinant (Cij) of likelihood values of the respective pixels computed irrespective of the part regions, and take the results thereof to be the final estimated likelihood map.

Figure 13:
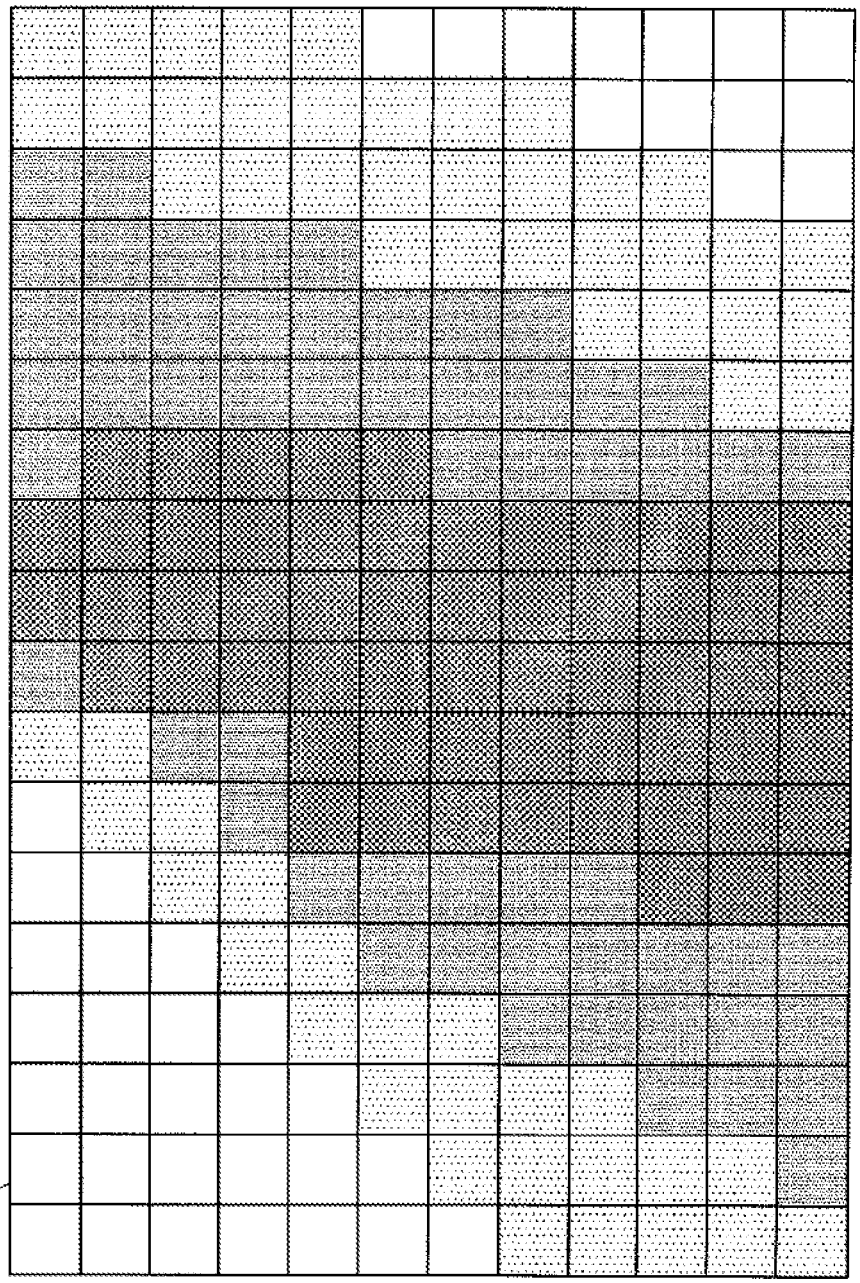
FIG. 13 is a diagram showing an example of an estimated likelihood map in Embodiment 1.

FIG. 13 is a diagram showing an example of an estimated likelihood map. Here, the likelihood values of just one designated part (e.g., the right upper arm) in an estimated likelihood map are shown, where pixels with higher likelihood values are shown with darker shadings. As shown in FIG. 13, estimated likelihood map 478 represents a distribution of likelihoods regarding designated part presence.

With respect to the information for each pixel in the likelihood map, for example, the likelihood value for part k is denoted by ck, where, if there are n designated parts, the data structure would be such that likelihood vector Cij=[c1, c2 . . . , ck . . . , cn].

Likelihood map generation section 150 thus generates an estimated likelihood map. This concludes this description of an estimated likelihood map generation process.

Next, in step S4600, posture state estimation section 160 acquires a learned likelihood map corresponding to the designated posture from posture state management section 110. Then, posture state estimation section 160 performs a match level determination process in which whether or not the estimated likelihood map matches with the learned likelihood map is determined on the basis of whether or not the level of match therebetween is equal to a predetermined level or greater.

An example of the details of the match level determination process will be described.

Posture state estimation section 160 first performs thresholding on the estimated likelihood map and the learned likelihood map using their respective predetermined thresholds. Specifically, posture state estimation section 160 converts the likelihood value of each pixel and each designated part to a digital signal of "1" if the likelihood value is equal to or greater than the predetermined threshold, or to a digital signal of "0" if the likelihood value is less than the predetermined threshold.

Figure 14:
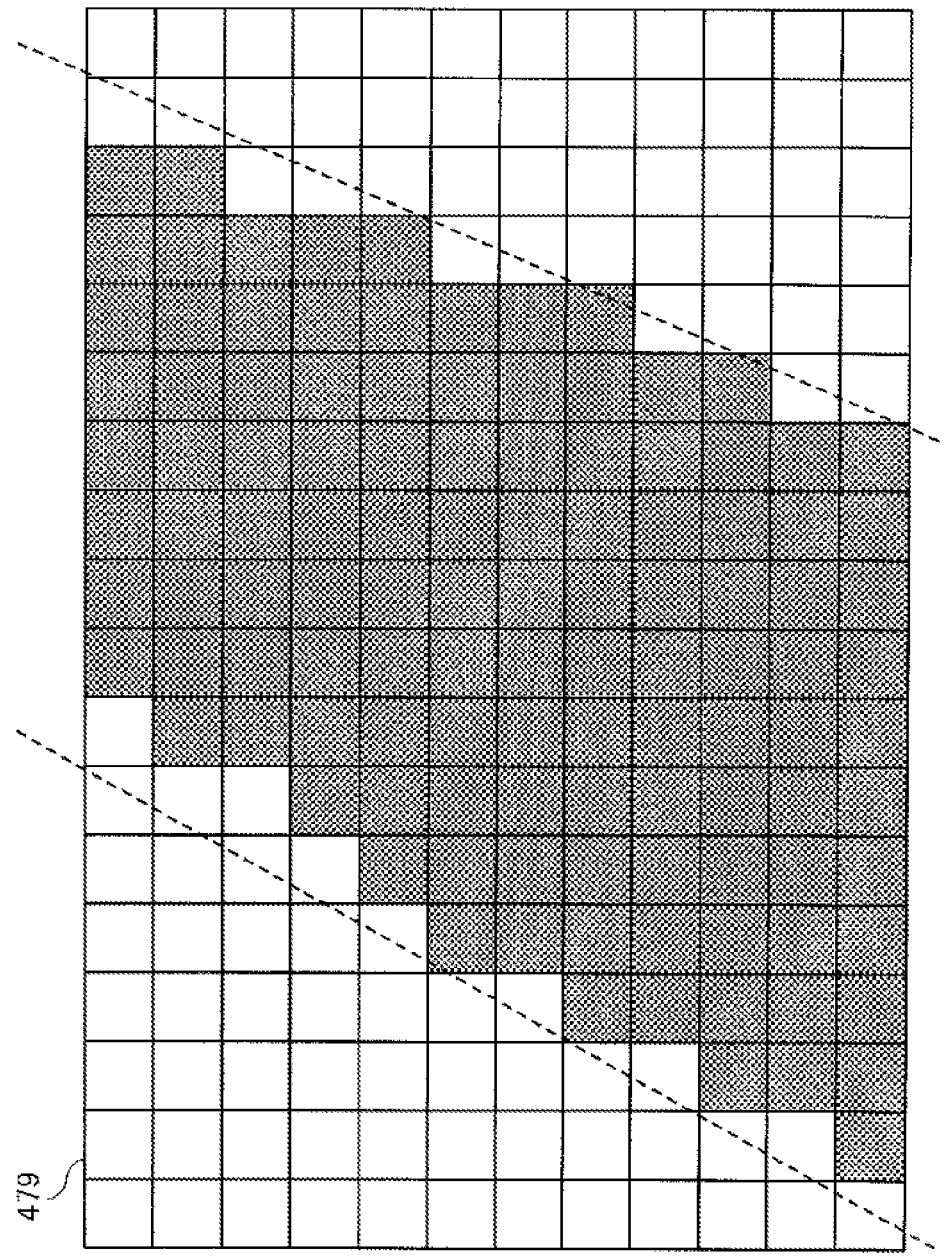
FIG. 14 is a diagram showing an example of an estimated likelihood map after thresholding in Embodiment 1.

FIG. 14 shows an example of a post-thresholding state of the estimated likelihood map shown in FIG. 13. Here, pixels with a digital signal of "1" are shown in grey, and pixels with a digital signal of "0" are shown in white. As shown in FIG. 14, thresholded estimated likelihood map 479 represents a distribution of portions where the designated part is likely to be located.

Then, posture state estimation section 160 computes the products of the thresholded likelihood values for each pixel and each designated part between the estimated likelihood map and the learned likelihood map, and takes the sum of the values for all pixels and all designated parts to be an evaluation value. Specifically, posture state estimation section 160 overlays the estimated likelihood map and the learned likelihood map on top of each other in a predetermined positional relationship, multiplies their thresholded likelihood value information for each pixel and computes the sum of the products for all pixels and all designated parts.

Posture state estimation section 160 shifts the positional relationship for overlaying the estimated likelihood map and the learned likelihood map through translation and rotation, and performs the above-mentioned computation processes for each positional relationship. Then, posture state estimation section 160 acquires the largest value among the computed evaluation values and takes it to be the final evaluation value representing the level of match. If this evaluation value is equal to or greater than a predetermined threshold, posture state estimation section 160 determines that the estimated likelihood map matches with the learned likelihood map. The threshold is pre-set to an appropriate value through learning and/or the like.

Posture state estimation section 160 does not necessarily have to perform thresholding on the estimated likelihood map and the learned likelihood map. In this case, posture state estimation section 160 can more accurately determine the level of match between the learned likelihood map and the estimated likelihood map. If thresholding is performed, however, posture state estimation section 160 can determine the level of match quickly.

Posture state estimation section 160 thus determines the level of match between the estimated likelihood map and the learned likelihood map. This concludes this description of the match level determination process.

If the estimated likelihood map matches with the learned likelihood map (S4600: YES), posture state estimation section 160 proceeds to step S4700. If the estimated likelihood map does not match with the learned likelihood map (S4600: NO), posture state estimation section 160 proceeds to step S4800.

In step S4700, posture state estimation section 160 informs the user of the estimation result that the posture of the person in the target image data is the designated posture, through information output apparatus 300, and returns to the process in FIG. 3.

In step S4800, posture state estimation section 160 informs the user of the estimation result that the posture of the person in the target image data is not the designated posture, through information output apparatus 300, and returns to the process in FIG. 3. Note that, in the case where the posture state cannot be determined for, for example, the reason that no one is detected from the target image data, posture state estimation section 160 may inform the user of the estimation result accordingly.

Note that the user can be informed of the estimation result in step S4700 or S4800 through the presence or absence of output or a difference in output contents of character display, image display, voice output, vibration output, and the like.

Through such an operation, posture state estimation apparatus 100 estimates part regions, and thus can generate the estimated likelihood map indicating a distribution of the likelihood of each designated part. Then, posture state estimation apparatus 100 compares the generated estimated likelihood map with the learned likelihood map associated with the designated posture, and thus can perform posture state estimation.

FIG. 15 each show an example of the case where it is determined to be a designated posture.

Figure 15A:
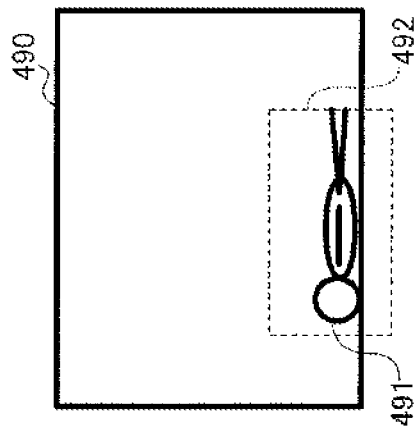
FIGS. 15A and 15B each show an example of the case where it is determined to be the designated posture according to Embodiment 1.

As shown in FIG. 15A, it is assumed that, in training image 480, parts of the entire body of person 481 are designated in association with a posture state of an "upright posture" with straight arms, legs, and back. In this case, part region 482 as the comparison target ranges to cover the entire body.

Figure 15B:
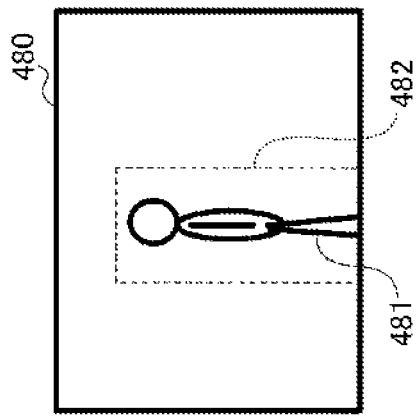

As shown in FIG. 15B, it is then assumed that, in an estimation phase, an "upright posture" is designated to estimated image 490. In this case, parts of the entire body of person 491 are designated parts, and part region 492 as the comparison target ranges to cover the entire body. The learned likelihood map of part region 482 based on training image 480 shown in FIG. 15A matches with the estimated likelihood map of part region 492 based on estimated image 490 if these maps are relatively translated and rotated. Accordingly, posture state estimation apparatus 100 can determine that the person in training image 480 is in the posture state of the "upright position."

FIG. 16 each show another example of the case where it is determined to be the designated posture.

Figures 16A, 16B, 16C, 16D, 16E:
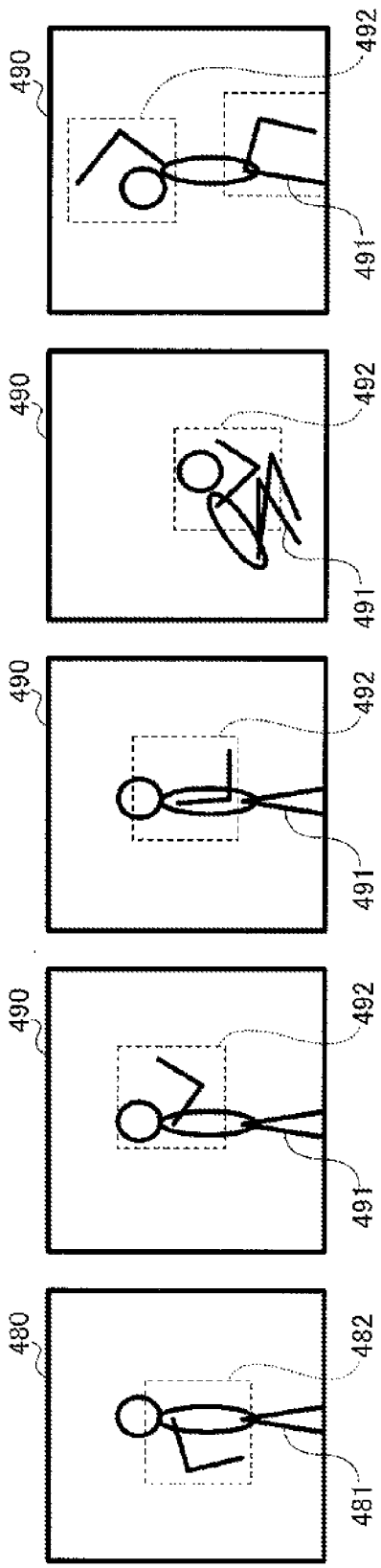

As shown in FIG. 16A, it is assumed that, in training image 480, the right upper arm and the right forearm of person 481 are designated in association with a posture state where "the right arm is bent." In this case, part region 482 as the comparison target ranges to cover the right upper arm and the right forearm.

As shown in FIGS. 16B to 16E, it is then assumed that, in an estimation phase, "the right arm is bent" is designated to each estimated image 490. In this case, the right upper arm and the right forearm of person 491 are designated parts, and part region 492 as the comparison target ranges to cover the right upper arm and the right forearm. The learned likelihood map of part region 482 based on training image 480 shown in FIG. 16A matches with the estimated likelihood map of part region 492 based on each estimated image 490 if these maps are relatively translated and rotated. Accordingly, posture state estimation apparatus 100 can determine that the person in training image 480 is in the posture state where "the right arm is bent."

The outline of person 491 in estimated image 490 in each of FIG. 16B to FIG. 16E is significantly different from the outline of person 481 in training image 480 in FIG. 16A. Accordingly, the related art described above determines that the person in estimated image 490 in each of FIG. 16B to FIG. 16E is not in the posture state where "the right arm is bent." In contrast, as described above, posture state estimation apparatus 100 according to the present embodiment can accurately perform posture state estimation.

Even if the postures of parts other than the right arm are different as in FIG. 16B to FIG. 16E, posture state estimation apparatus 100 according to the present embodiment can determine that the person in the target image data is in the posture state where "the right arm is bent." That is, posture state estimation apparatus 100 can extract postures for which only the designated parts are focused on, regardless of the postures of the other parts.

As described above, because posture state estimation apparatus 100 according to the present embodiment uses the likelihood map indicating a distribution of the likelihood of each part, the posture state of the person can be accurately estimated. Further, because posture state estimation apparatus 100 estimates part regions and generates the estimated likelihood map where the likelihood value is set low for regions other than the part regions, the accuracy of the likelihood map can be improved, and posture state estimation can be further accurately performed.

Note that, in Embodiment 1 described above, posture state estimation apparatus 100 estimates only a given posture state that is specifically designated, but may estimate which of a plurality of posture states matches. In this case, for example, posture state estimation apparatus 100 may treat all posture states whose corresponding learned likelihood map is stored in posture state management section 110, as the designated postures. Further, in the case where an instruction to perform posture state estimation is given with no posture state being designated, posture state estimation apparatus 100 may treat all posture states as the designated postures.

The image data used for posture state estimation may also be data of images captured by a stereo camera or a plurality of cameras. When using image data of a stereo camera, posture state estimation apparatus 100 may use image data captured by one of the cameras and position information of the subject as derived from the installation parameters of the stereo camera. Further, when using image data of a plurality of cameras, posture state estimation apparatus 100 may use image data captured by one of those cameras and position information of the subject as derived from the installation parameters of each camera.

If the positions and orientations of the reference parts are known or designated, part region estimation section 140 need not perform the above-mentioned reference part estimation process. If, for example, the direction in which a person walks is fixed and the orientations of the reference parts are generally uniform, part region estimation section 140 may hold body orientation information.

The part region estimation method performed by part region estimation section 140 is by no means limited to the examples provided above. By way of example, part region estimation section 140 may extract edge portions (hereinafter simply referred to as "edges") of an image from the estimated image data, and estimate each part region on the basis of the range of Y-coordinate values in the region enclosed by the edges. Specifically, for example, part region estimation section 140 may estimate, in the region enclosed by the edges, 20% of the region starting from the position where the Y-coordinate value is greatest to be a part region for the head. Similarly, for example, part region estimation section 140 may estimate the region from 15% to 65% to be a part region for the torso, the region from 55% to 85% to be a part region for the thighs, and the region from 75% to 100% to be a part region for the crura.

If the estimated image data is still image data forming video data, part region estimation section 140 may extract a moving body by computing background differences between images, and take an entire region including the extracted region to be a part region candidate for each part. This expedites processing in estimating part regions.

Posture state estimation apparatus 100 may estimate the part region of each part of interest by repeating a process where part positions are estimated one by one in order of increasing distance from the reference parts and where the part region of the next part is estimated on the basis of the estimated position.

In the case where a learned likelihood map is associated with information regarding the optical axis direction of the image serving as the basis of the learned likelihood map, posture state estimation section 160 may make comparisons using the learned likelihood map corresponding to installation angle θ of monocular camera 200.

Posture state estimation apparatus 100 does not necessarily have to perform part region estimation. In this case, likelihood map generation section 150 computes likelihood values uniformly for all regions in the image.

The type of likelihood maps treated by posture state estimation apparatus 100 is by no means limited to likelihood maps generated according to the examples provided above. For example, the estimated likelihood map and the learned likelihood map may be generated by extracting parallel lines from the edges.

In this case, likelihood map generation section 150 stores in advance, for example, a correspondence table in which shoulder joint lengths and standard thickness values for various parts are associated with each other. Likelihood map generation section 150 searches a part region for a pair of parallel lines spaced apart by a distance corresponding to the standard thickness for that part while rotating the direction of determination by 360°. Likelihood map generation section 150 repeats a process where, if there is a matching parallel line pair, a vote is cast for each pixel in the region enclosed by those parallel lines, and generates an estimated likelihood map based on the final number of votes for each pixel.

With such a method, the estimated likelihood map and the learned likelihood maps would include, for each pixel and each designated part, directions of parallel lines and numbers of votes (hereinafter referred to as "directional likelihood values"). By way of example, assuming that parallel line angles are divided into eight categories, the likelihood value of each pixel and each designated part would assume an eight-dimensional value corresponding to those eight directions. By way of example, further assuming that parallel line widths are divided into two categories, the likelihood value of each pixel and each designated part would assume a sixteen-dimensional (2×8=16) value. The parallel line distance or angle to be voted on may vary from part to part. By computing a plurality of parallel line widths and using the likelihood value of the width with the highest likelihood value, likelihood may be computed while absorbing differences in body type and clothing.

Likelihood map generation section 150 then determines, for each designated part, that the direction with the highest directional likelihood value is the main edge direction for that designated part, for example. In so doing, posture state estimation section 160 may compute the sum of likelihood values for all pixels for each direction, and determine the direction with the highest sum to be the direction with the highest directional likelihood value.

For each designated part, posture state estimation section 160 overlays the estimated likelihood map and a learned likelihood map on top of each other in such a manner that key edge directions coincide therebetween, and computes the level of match. Subsequent processes are similar to those in the method that has been described in the present embodiment.

A method that thus takes edge directions into account makes it possible to place constraints on the positional relationship for overlaying the estimated likelihood map and a learned likelihood map on top of each other, thereby enabling a reduction in processing load.

In computing the level of match between the estimated likelihood map and a learned likelihood map, only the edge direction information may also be used. In this case, for example, posture state estimation section 160 takes the level of match with respect to angles formed between edge directions of a plurality of specified parts to be an evaluation value representing the level of match between the estimated likelihood map and a learned likelihood map. If the evaluation value falls within a predetermined range, posture state estimation section 160 determines that the posture of the person in the target image data is the designated posture.

A method that thus determines level of match using edge directions alone renders unnecessary the process of repeatedly computing a plurality of evaluation values while rotating the image, and is thus capable of further reducing the processing load. This concludes this description of a second example of a match level determination process.

Embodiment 2

Embodiment 2 of the present invention is an example in which a posture state estimation apparatus also generates a learned likelihood map. The posture state estimation apparatus according to the present embodiment performs a learning phase process for learned likelihood map generation as well as the estimation phase process for posture state estimation.

Figure 17:
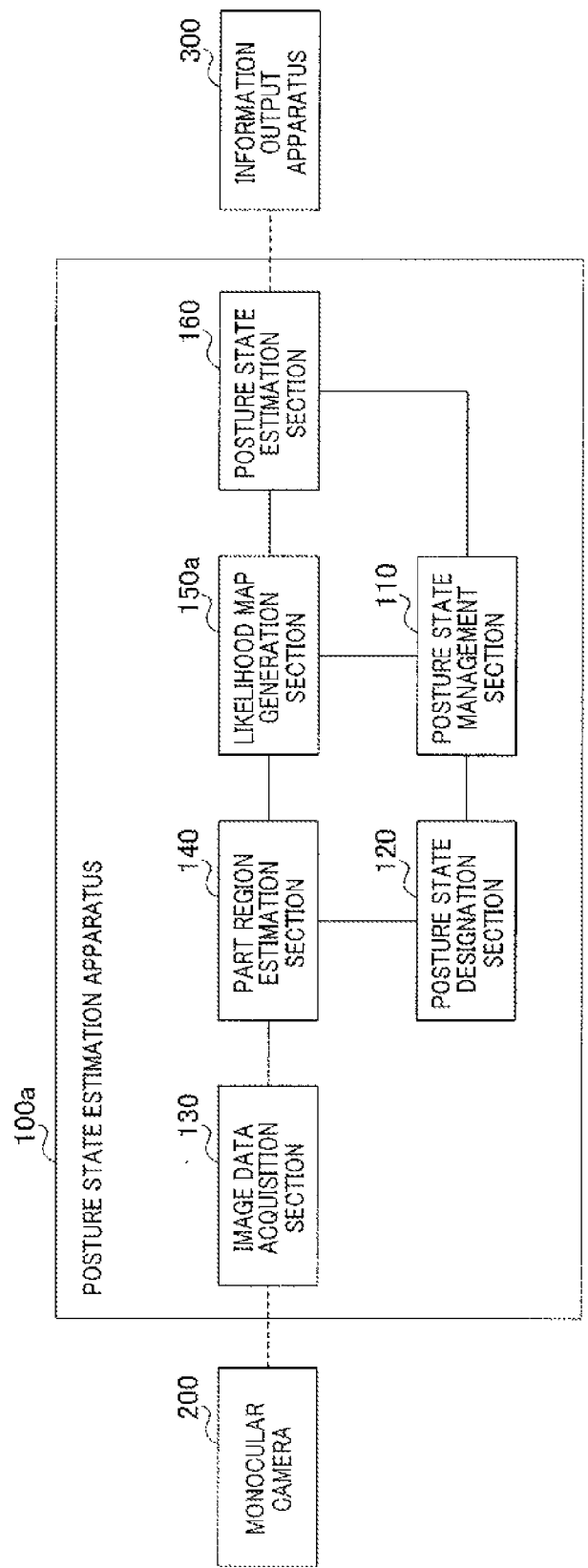
FIG. 17 is a block diagram showing a configuration example of a posture state estimation apparatus according to Embodiment 2 of the present invention.

FIG. 17 is a block diagram showing a configuration example of the posture state estimation apparatus according to Embodiment 2 of the present invention, which corresponds to FIG. 1 of Embodiment 1. Elements common to those in FIG. 1 are denoted by the same reference signs, and description thereof is omitted.

As shown in FIG. 17, posture state estimation apparatus 100a according to the present embodiment includes likelihood map generation section 150a different from that in Embodiment 1.

Image data acquisition section 130 and part region estimation section 140 according to the present embodiment perform processing similar to that performed on the estimated image data, on image data received in a learning phase (hereinafter referred to as "learned image data"), to thereby estimate part regions.

Also in the learning phase, posture state designation section 120 according to the present embodiment receives the designation of a posture state and parts, and outputs the designated posture and the designated parts.

Also in the learning phase, likelihood map generation section 150a performs processing similar to that performed on the estimated image data, on the learned image data, to thereby generate a likelihood map where the likelihood that each designated part corresponding to the part region is located thereat is set low. Likelihood map generation section 150a stores, as a learned likelihood map, the likelihood map generated from the learned image data into posture state management section 110 in association with the designated posture and the designated part. Likelihood map generation section 150a does not output the likelihood map generated from the learned image data to posture state estimation section 160.

Posture state estimation apparatus 100*a* thus configured receives the learned image data and the designation of the posture state and the parts and thereby generates the learned likelihood map, and can perform posture state estimation on the target image data using the generated learned likelihood map.

The operation of posture state estimation apparatus 100*a* will be described.

Figure 18:
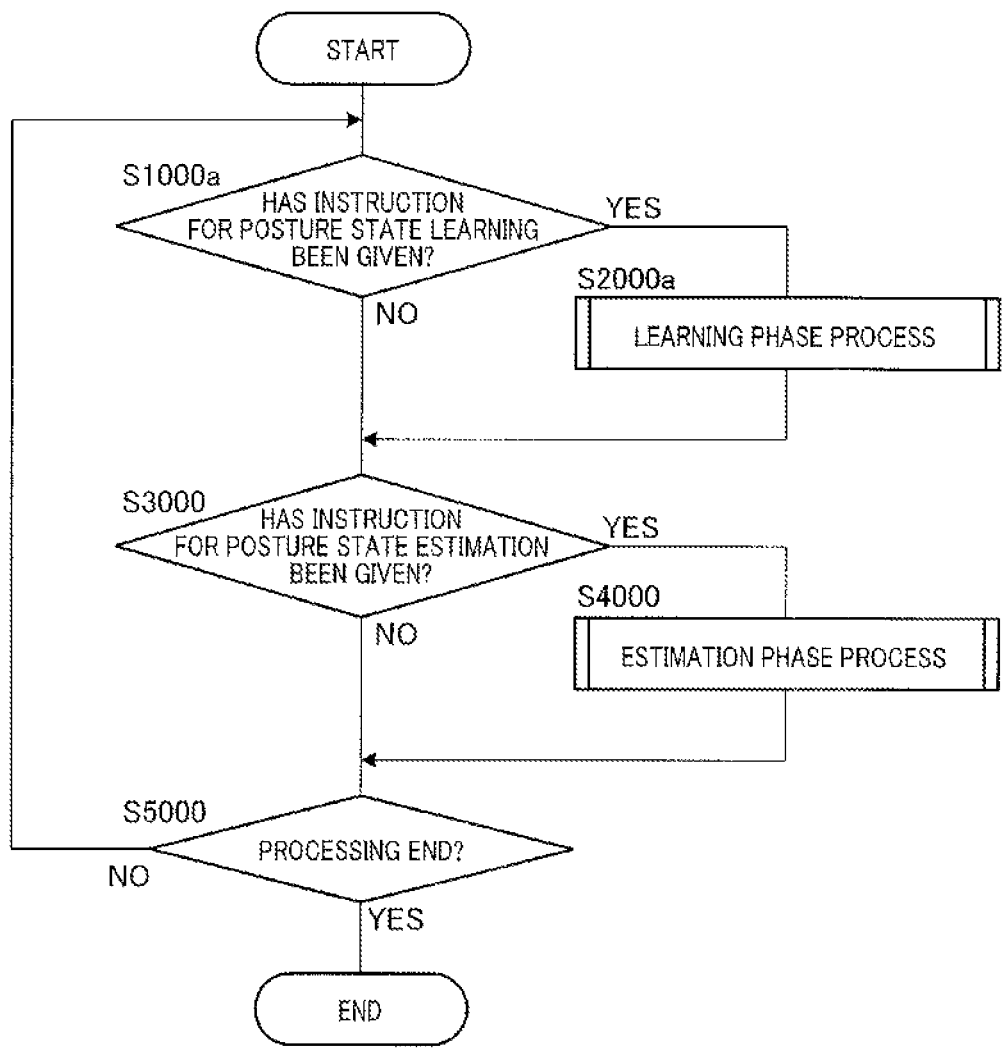
FIG. 18 is a flowchart showing an operation example of the posture state estimation apparatus according to Embodiment 2.

FIG. 18 is a flowchart showing an operation example of posture state estimation apparatus 100*a*, which corresponds to FIG. 3 of Embodiment 1. Steps common to those in FIG. 3 are denoted by the same step numbers, and description thereof is omitted.

First, in step S1000*a*, part region estimation section 140 determines whether or not an instruction for posture state learning has been given. The posture state learning means learned likelihood map generation. Part region estimation section 140 determines that an instruction for posture state learning has been given, for example, when posture state designation section 120 receives the designation of a new posture state or when image data acquisition section 130 receives new estimated image data, in the learning phase. The switching between the learning phase and the estimation phase is made, for example, when a predetermined operation is received from the user through an input apparatus (not shown) such as a keyboard. If an instruction for posture state learning has been given (S1000*a*: YES), part region estimation section 140 proceeds to step S2000*a*. If an instruction for posture state learning has not been given (S1000*a*: NO), part region estimation section 140 proceeds to the processing from steps S3000 to S5000 described in Embodiment 1.

In step S2000*a*, posture state estimation apparatus 100 performs the learning phase process for posture state learning, and proceeds to the processing from steps S3000 to S5000 described in Embodiment 1.

Figure 19:
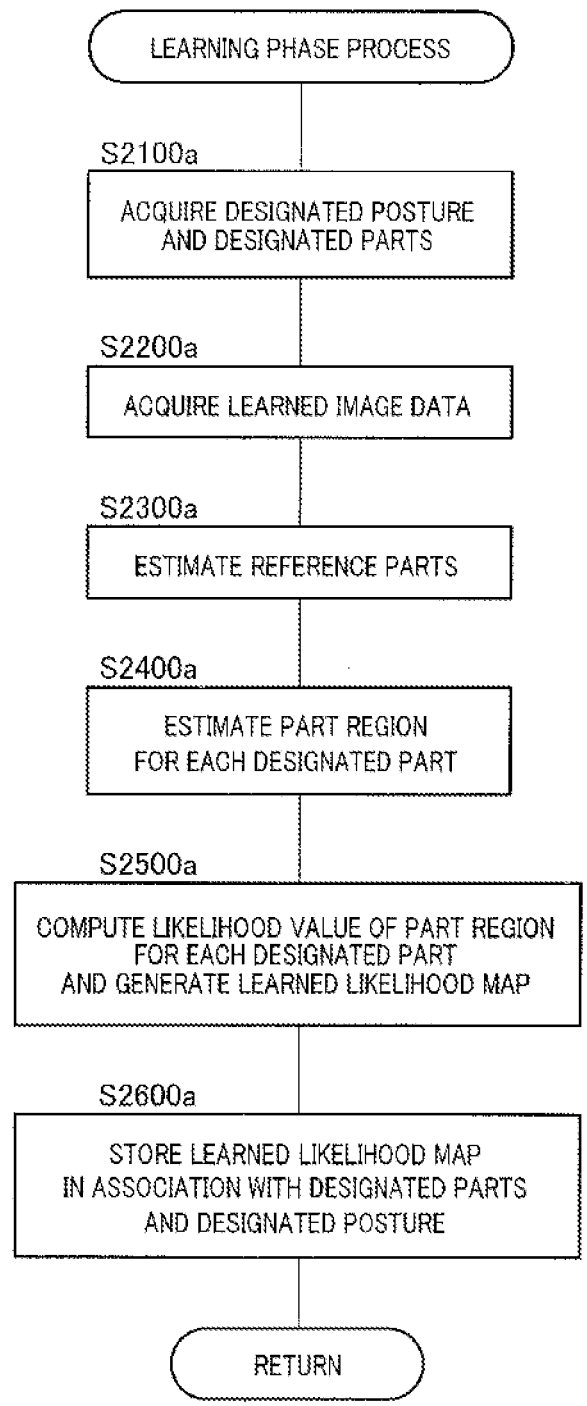
FIG. 19 is a flowchart showing an example of a learning phase process according to Embodiment 2.

FIG. 19 is a flowchart showing an example of the learning phase process (step S2000*a* in FIG. 18).

In step S2100*a*, posture state designation section 120 receives the designation of a posture state from the user to acquire the designated posture and acquire designated parts corresponding to the designated posture. Note that designated parts corresponding to the designated posture need to be acquired from the outside at least once. Posture state designation section 120 may store sets of a designated posture and designated parts, automatically determine designated parts on the basis of a designated posture from the second time, and omit the reception of part designation.

Then, in step S2200*a*, part region estimation section 140 acquires the learned image data from monocular camera 200 through image data acquisition section 130. The learned image data may be still image data forming video data that is captured continuously in real time by monocular camera 200, and may be image data captured and stored in advance. The learned image data may also be not image data obtained by capturing an actual person but image data created using computer graphics (CG) software on a computer. In particular, image data created using motion capture software is capable of simultaneous acquisition of three-dimensional posture information of a person, and thus can improve the convenience in learned likelihood map generation.

Then, in step S2300*a*, part region estimation section 140 performs processing similar to the reference part estimation process described in Embodiment 1, on the learned image data, to thereby estimate reference parts.

Then, in step S2400*a*, part region estimation section 140 performs processing similar to the part region estimation process described in Embodiment 1, on the learned image data, to thereby estimate a part region for each designated part.

Then, in step S2500*a*, likelihood map generation section 150*a* performs processing similar to the estimated likelihood map generation process described in Embodiment 1, on the learned image data, to thereby compute the likelihood value of the part region for each designated part and generate the learned likelihood map.

Then, in step S2600*a*, likelihood map generation section 150*a* stores the generated learned likelihood map into posture state management section 110 in association with the designated parts and the designated posture, and returns to the process in FIG. 18.

Note that, in the case where the same posture state is designated to a plurality of pieces of learned image data, that is, in the case where a plurality of learned likelihood maps with the same designated posture exist, likelihood map generation section 150*a* may store a learned likelihood map made of an average value of likelihood values in posture state management section 110.

Through the operation described above, posture state estimation apparatus 100*a* can receive the learned image data and the designation of the posture state and the parts, thereby generate and store the learned likelihood map. As a result, the learned likelihood map is generated on the basis of, for example, part region 482 shown in FIG. 16A of Embodiment 1, and is stored in association with the posture state where "the right arm is bent" and the parts of the "right upper arm" and the "right forearm."

As described above, because posture state estimation apparatus 100*a* according to the present embodiment generates the learned likelihood map indicating a distribution of the likelihood of each part for each posture state, and uses the generated learned likelihood map, the posture state of the person can be accurately estimated.

For example, as described in Embodiment 1, the related art described above determines that the person in estimated image 490 in each of FIG. 16I to FIG. 16E is not in the posture state where "the right arm is bent." In order to prevent the related art from making such a determination, it is necessary to prepare training images for all the outlines shown in FIG. 16B to FIG. 16E and generate learned likelihood maps. Such exhaustive learning requires time and effort. Further, as the number of stored learned likelihood maps increases, the determination of a level of match also requires a longer time. In contrast, with the use of posture state estimation apparatus 100*a* according to the present embodiment, learning on training image 480 shown in FIG. 16A is sufficient as described above, so that an increase in the number of learned likelihood maps can be limited.

It is assumed that, in the case of using an estimated likelihood map generated according to another method, such as the estimated likelihood map based on the edge direction as described in Embodiment 1, posture state estimation apparatus 100*a* generates a learned likelihood map according to the corresponding method.

The present invention is not limited to the application of posture state estimation of a person described in Embodiment 1 and Embodiment 2. The present invention can also be applied to estimation of the posture states of various objects (such as a robot) having a plurality of parts articulated by joints.

An example of performing posture estimation using an irregularity map will be described as Embodiment 3 of the present invention. The irregularity map here refers to a map in which the surface of the subject projected in the image is divided according to its irregularities.

Embodiment 3

Figure 20:
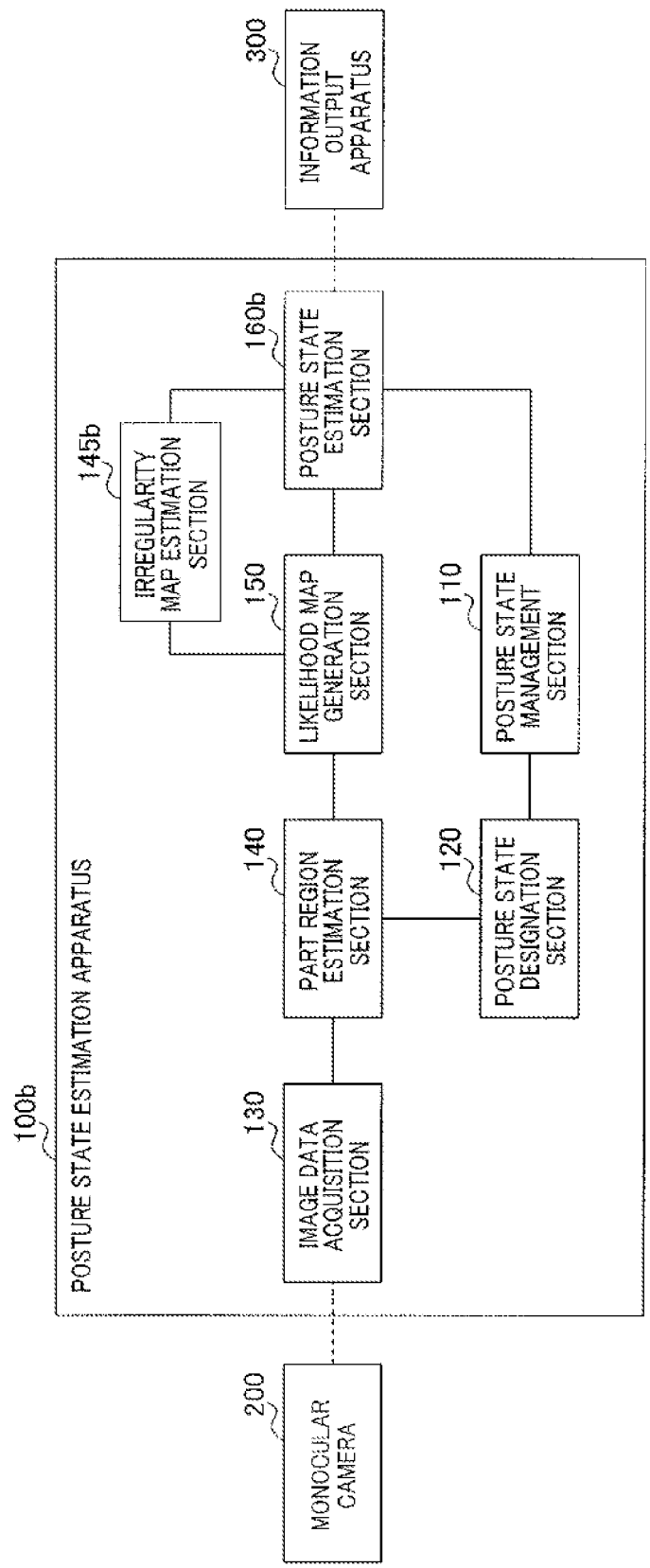
FIG. 20 is a block diagram showing a main configuration of a posture state estimation apparatus according to Embodiment 3 of the present invention.

FIG. 20 is a block diagram showing a main part configuration of a posture state estimation apparatus according to Embodiment 3 of the present invention, which corresponds to posture state estimation apparatus 100 in FIG. 1 of Embodiment 1. Note that, in FIG. 20, configuration elements common to those in FIG. 1 are denoted by the same reference signs as those in FIG. 1, and description thereof is omitted.

In addition to the configuration in FIG. 1, posture state estimation apparatus 100b in FIG. 20 further includes irregularity map estimation section 145b.

Irregularity map estimation section 145b generates an irregularity map of each part. More specifically, irregularity map estimation section 145b receives the estimated likelihood map and the estimated image data from likelihood map generation section 150. Then, irregularity map estimation section 145b generates the irregularity map on the basis of the received information, and outputs the generated irregularity map to posture state estimation section 160b. Details of the method of generating the irregularity map will be described later. The irregularity map generated from the estimated image data is hereinafter referred to as "estimated irregularity map."

In addition to the learned likelihood map, posture state estimation section 160b holds in advance, for each posture state, an irregularity map learned from the reference model in that posture state (hereinafter referred to as "learned irregularity map"). Then, posture state estimation section 160b estimates the posture state of the subject on the basis of the level of match between the estimated irregularity map and the learned irregularity map as well as the level of match between the estimated likelihood map and the learned likelihood map. That is, in addition to the operation of Embodiment 1, posture state estimation section 160b further performs matching between the estimated irregularity map and the learned irregularity map.

The irregularity map will first be described.

Irregularity map estimation section 145b estimates the orientation of the surface of a part from brightness information of the part in the image. The brightness here refers to, for example, the level of luminance, and the brightness information here refers to information indicating luminance or the level of luminance.

FIG. 21 illustrate the relation between the posture of a person and the brightness of each part.

Figure 21E:
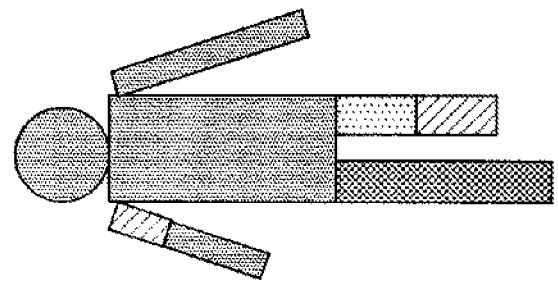
FIGS. 21A to 21E illustrate the relation between the posture of a person and the brightness of each part according to Embodiment 3.
Figure 21D:
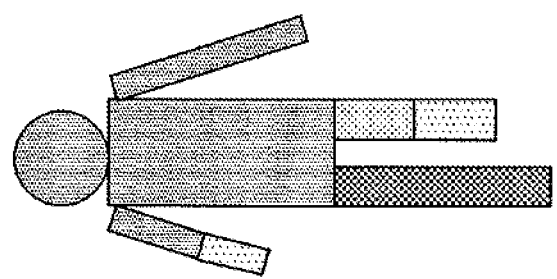
Figure 21C:
Figure 21B:
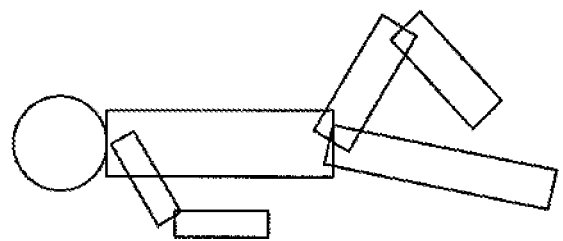
Figure 21A:
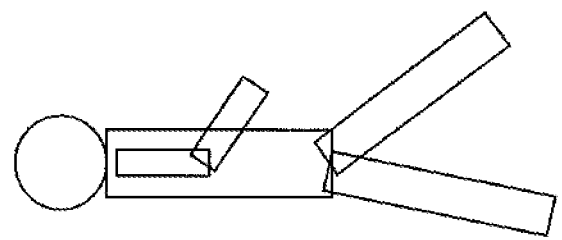

A first posture shown in FIG. 21A and a second posture shown in FIG. 21B are different from each other, but it is assumed that the first and second postures have the same silhouette as viewed from the front as shown in FIG. 21C. In this case, it is not possible to correctly estimate whether the posture of the target person is the first posture or the second posture, only from region information defined by edges of the front image.

For example, it is understood, from the silhouette shown in FIG. 21C, that the length of the right arm is smaller than the length of the left arm, and hence it can be inferred that the right elbow is highly likely to be bent. There are, however, a variety of bending forms that satisfy the body constraint. As shown in FIG. 21A and FIG. 21B, there are also a variety of angles of the entire right arm.

For example, it is understood, from the silhouette shown in FIG. 21C, that the length of the left leg is smaller than the length of the left arm, and hence it can be inferred that the left knee is likely to be bent. There may be, however, cases as shown in FIG. 21A and FIG. 21B where the left knee is bent and where the left knee is straight.

If the border positions (in other words, the joints) between the upper arm and the forearm and between the thigh and the crus can be estimated, it is possible to estimate which of the variety of postures described above the target person has. Unfortunately, in the case of such a posture as shown in FIG. 21C where the arms and the legs look straight, it is difficult to estimate these border positions even using the body constraint, only from the region information defined by edges.

In view of the above, in order to deal with such a posture whose joint position (border of respective parts) cannot be identified only from the region information, posture state estimation apparatus 100b estimates the part region using the brightness information as well as the region information.

FIG. 21D shows, using color density, the brightness of each part in the first posture as taken from the front when natural light from the above is a light source. FIG. 21E shows, using color density, the brightness of each part in the second posture as taken from the front when natural light from the above is a light source. In these figures, a higher color density means a lower brightness (darker). Further, it is assumed that five levels of "−2, −1, 0, 1, 2" are defined as the brightness in order from the darkest level. The level "0" is, for example, a level of brightness of a surface perpendicular to the ground.

The level of brightness of each region of the image is higher for a region having a surface that faces more upward, and is lower for a region having a surface that faces more downward.

For example, as shown in FIG. 21D and FIG. 21E, for both the first and second postures, the regions of the head, the torso, and the left arm are in the level "0," and the region of the right leg is in the level "−1," which is slightly darker.

In the first posture, the right upper arm extends perpendicularly downward, and the right forearm extends frontward. Hence, as shown in FIG. 21D, the region of the right upper arm is in the level "0," and the region of the right forearm is in the level "2." In comparison, in the second posture, the right upper arm is drawn back, and the right forearm extends downward. Hence, as shown in FIG. 21E, the region of the right upper arm is in the level "−2," and the region of the right forearm is in the level "0."

In the first posture, the entire left leg extends frontward. Hence, as shown in FIG. 21D, the regions of the left thigh and the left crus are in the level "1." In comparison, in the second posture, the left thigh is moved upward, and the left crus extends backward. Hence, as shown in FIG. 21E, the region of the left thigh is in the level "2," and the region of the left crus is in the level "−2."

In this way, each part can be considered as a surface having the same brightness. Accordingly, from the brightness information of the part in the image, the position of the part can be estimated.

Next, operations of posture state estimation apparatus 100b configured as described above will be described with reference to a processing flow of FIG. 22. Note that, in FIG. 22, steps common to those in FIG. 4 of Embodiment 1 are denoted by the same step numbers as those in FIG. 4, and description thereof is omitted.

Upon the generation of the estimated likelihood map (S4500), the processing proceeds to S4510b.

In S4510b, irregularity map estimation section 145b performs an estimated irregularity map generation process. The estimated irregularity map generation process is a process of generating the estimated irregularity map from the estimated image data acquired in S4200 and the estimated likelihood map generated in S4500.

Figure 22:
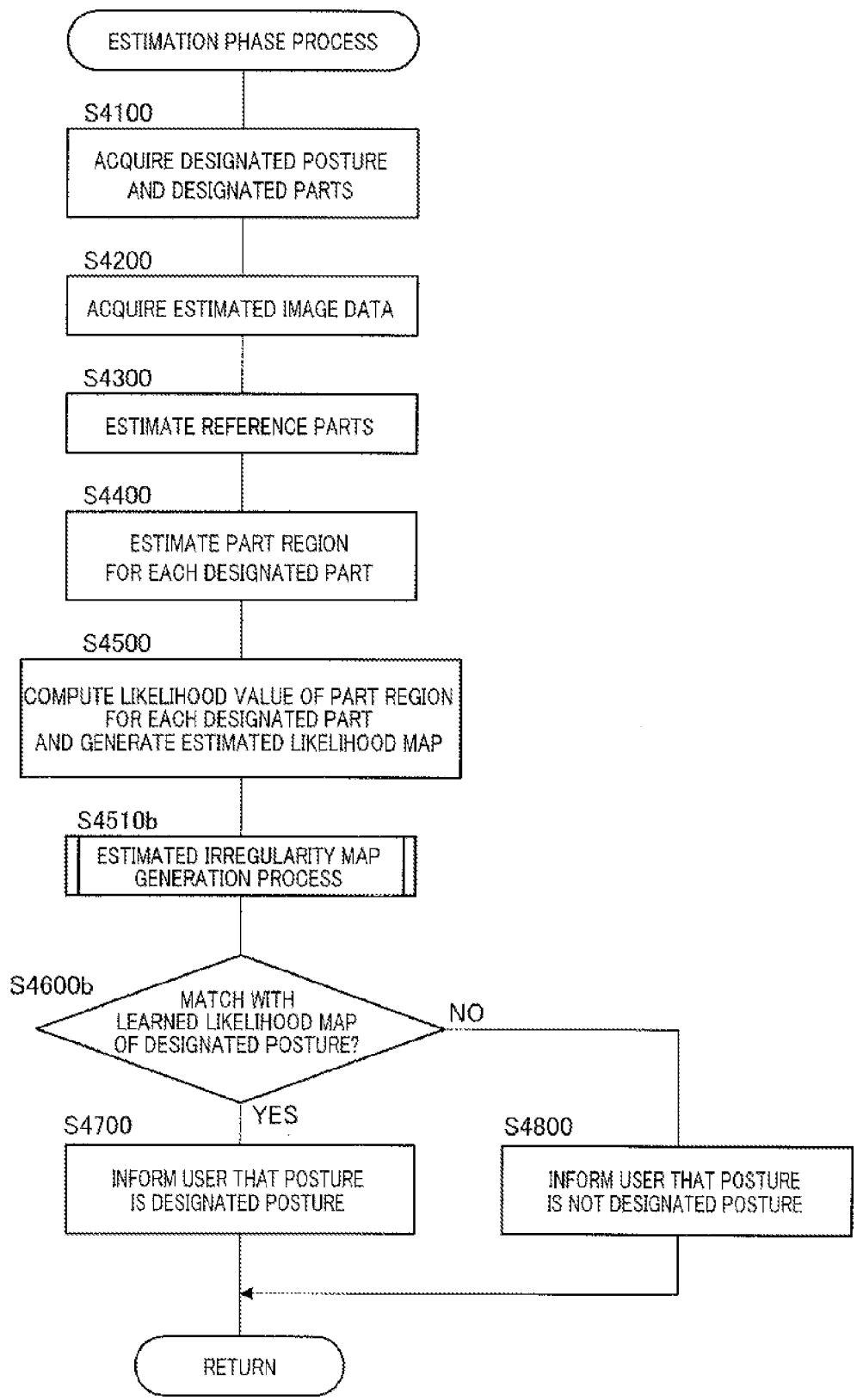
FIG. 22 shows a processing flow example of the posture state estimation apparatus according to Embodiment 3.
Figure 23:
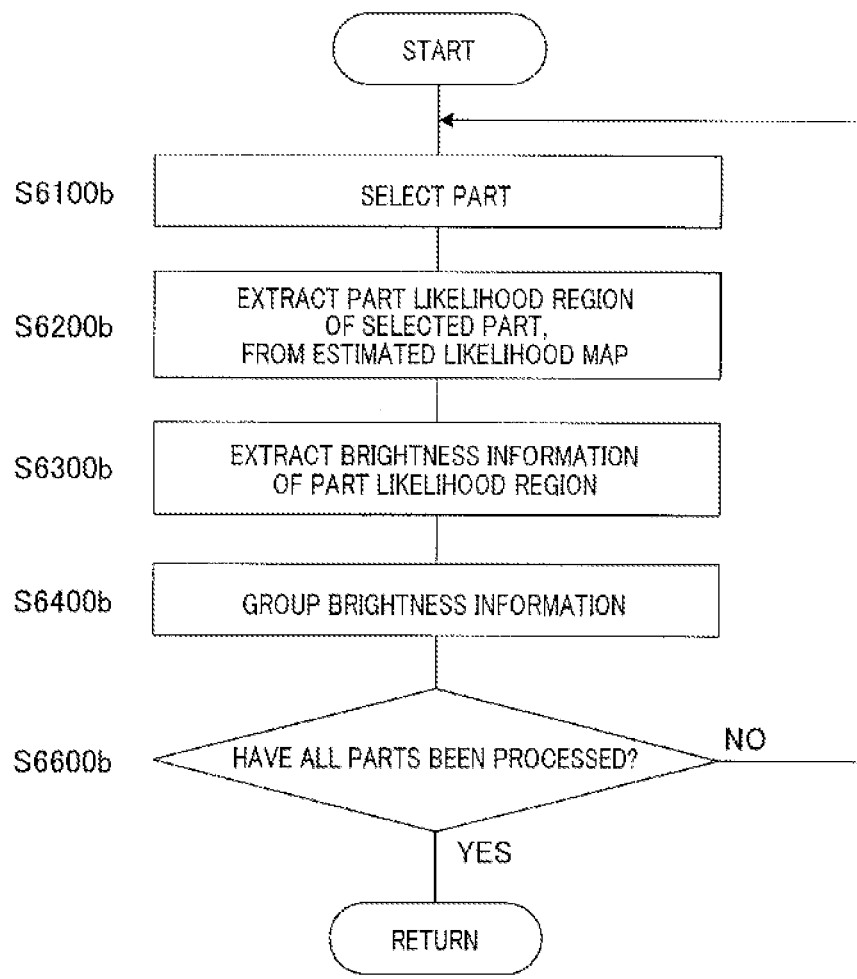
FIG. 23 shows a processing flow example of an irregularity map generation process according to Embodiment 3.

FIG. 23 shows a processing flow of the irregularity map generation process (step S4510b in FIG. 22).

In pixel-based information of the estimated irregularity map, for example, the likelihood of part k is expressed by pk. In the case where n parts exist, the pixel-based information has a data structure of irregularity vector Oij [p1, p2, ..., pk, ..., pn]. pk is binary information, and the value of pk takes, for example, any of 0 indicating that there is no possibility of the part k and 1 indicating that there is a possibility of the part k.

In S6100b, irregularity map estimation section 145b selects one part as the processing target. For example, if the right arm is the target of the irregularity map generation process, irregularity map estimation section 145b first selects the right forearm farthest from the core part.

Then, in S6200b, irregularity map estimation section 145b acquires the region (hereinafter referred to as "part likelihood region") of the part selected in S6100b, from the estimated likelihood map generated in S4500. Here, irregularity map estimation section 145a extracts pixels whose likelihood of the right forearm in the estimated likelihood map exceeds a predetermined threshold, and takes the extracted pixels to be the part likelihood region of the right forearm.

Then, in S6300b, irregularity map estimation section 145b extracts the brightness information of the part likelihood region extracted in S6200b, from the estimated image data acquired in S4200. The brightness information can be extracted by, for example, extracting only the luminance (pixel brightness) from the RGB value of each pixel forming the estimated image data and thus obtaining a grayscale image.

Then, in S6400b, irregularity map estimation section 145b groups the brightness information of the part likelihood region obtained in S6300b, with the use of a brightness threshold. The brightness threshold used by irregularity map estimation section 145b may be a fixed value set in advance, and may be dynamically set. An example method of dynamically setting the threshold will be described below.

Figure 24:
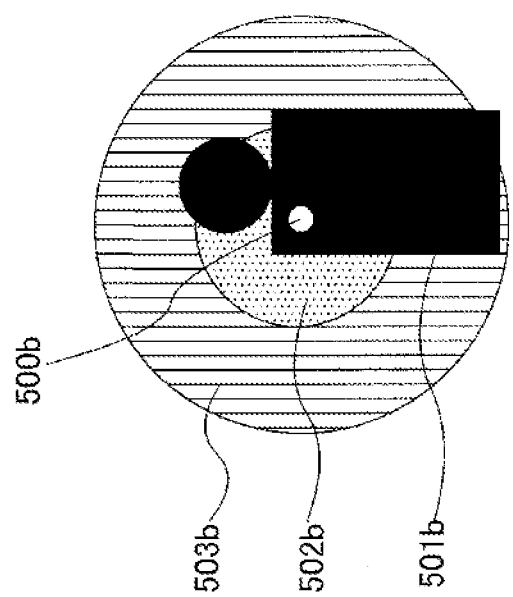
FIG. 24 illustrates a method for area classification according to Embodiment 3.

FIG. 24 illustrates a method for area classification using the body constraint of the right forearm. For ease of description, it is assumed that the torso has only the right arm.

In step S4300 in FIG. 22, for example, with estimated right shoulder position 500b as the reference, the head/shoulder region and torso region 501b connected thereto are estimated. In this case, the region in which the right upper arm and the right forearm can exist is as indicated by region 502b, and the region in which only the right forearm can exist is as indicated by region 503b. Regions 502b and 503b can be computed from, for example, the part region correspondence table shown in FIG. 11.

Irregularity map estimation section 145b first extracts the luminance value (brightness information) of pixels existing in region 503b, from this region 503b in which only the right forearm can exist, of the part likelihood region of the right forearm.

Then, assuming that a % of total number m of the target pixels is n, irregularity map estimation section 145b excludes n pieces in order from the smallest one and n pieces in order from the largest one, from the extracted luminance value data. Further, irregularity map estimation section 145b takes the smallest value and the largest value of the data after the exclusion of these 2n pieces of data (the number of pieces of data is m−2n) to be the threshold of the brightness information of the right forearm (the upper limit and the lower limit of the range of the luminance value regarded as the right forearm). Note that a is a value set in advance.

Then, for example, irregularity map estimation section 145b sets a value (for example, 1) indicating that there is a possibility of the right forearm, to a value indicating the right forearm, of irregularity vector Oij of pixels that fall within this threshold (that is, fall within the range of the luminance value regarded as the right forearm), in the part likelihood region of the right forearm.

In this way, irregularity map estimation section 145b sets the threshold of the luminance value using only the brightness information of the part likelihood region in which only the right forearm exists according to the body constraint. As a result, irregularity map estimation section 145b can identify the pixels having the brightness information of the right forearm without an influence of other parts.

Next, irregularity map estimation section 145b extracts the luminance value (brightness information) of pixels from region 502b in which only the right upper arm and the right forearm can exist, of the part likelihood region of the right forearm.

Then, irregularity map estimation section 145b deletes data that falls within the threshold of the brightness information of the right forearm obtained in the previous step, from the extracted luminance value data. Then, assuming that b % of total number p of remaining pieces of the luminance value data is q, irregularity map estimation section 145b excludes q pieces in order from the smallest one and q pieces in order from the largest one, from the extracted luminance value data. Further, irregularity map estimation section 145b takes the smallest value and the largest value of the data after the exclusion of these 2q pieces of data (the number of pieces of data is p−2q) to be the threshold of the brightness information of the right upper arm (the upper limit and the lower limit of the range of the luminance value regarded as the right upper arm). Note that b is a value set in advance.

Then, for example, irregularity map estimation section 145b sets a value (for example, 1) indicating that there is a possibility of the right upper arm, to a value indicating the right upper arm, of irregularity vector Oij of pixels that fall within this threshold (that is, fall within the range of the luminance value regarded as the right upper arm), in the part likelihood region of the right forearm.

In this way, irregularity map estimation section 145b excludes the data in the range of the luminance value regarded as the right forearm, from the data of the brightness information of the part likelihood region in which only the right upper arm and the right forearm exist according to the body constraint, to thereby set the threshold. As a result, irregularity map estimation section 145b can identify the pixels having the brightness information of the right upper arm without an influence of other parts, and can accurately identify the pixels having the brightness information of the right upper arm.

In this way, irregularity map estimation section 145b sets the threshold of the brightness information using the brightness information of the region in which only the target part exists, in order from parts farther from the core part, and groups the brightness information of each part to estimate the region.

Note that there may be a case where the part likelihood region of the right forearm does not exist in region 503b in which only the right forearm can exist. In such a case, irregularity map estimation section 145b may perform, for example, a process of: extracting the luminance information of pixels existing in region 502b in which only the right upper arm and the right forearm can exist, of the part likelihood regions of the right forearm and the right upper arm; and making a classification into two groups of the right forearm and the right upper arm. Then, irregularity map estimation section 145b sets the above-mentioned threshold using, for example, Otsu's thresholding. As a result, even in the case where the part likelihood region of the right forearm does not exist in region 503b in which only the right forearm can exist, irregularity map estimation section 145b can set the thresholds of the brightness information of the right upper arm and the right forearm.

There may be a case where, after the setting of the brightness information of the right forearm for region 503b in which only the right forearm can exist, a threshold different from that of the right forearm cannot be set because a pixel having brightness information different from that of the right forearm does not exist in spite of region 502b in which only the right upper arm and the right forearm can exist. In such a case, irregularity map estimation section 145b may set, for example, the same value as that of the right forearm to the brightness information of the right upper arm. As a result, even in the case where the orientations of the surfaces of the right upper arm and the right forearm are similar to each other (where the right arm is straight), irregularity map estimation section 145b can set the brightness information of the right upper arm.

In S6500b in FIG. 23, irregularity map estimation section 145b determines whether or not all the parts as the targets of the irregularity map generation process have been processed. For example, in the case where the estimated irregularity map is generated also for the left arm, irregularity map estimation section 145b returns to S6100b, and performs processing similar to that performed on the right arm, on the left arm.

Then, irregularity map estimation section 145b outputs the generated estimated irregularity map to posture state estimation section 160b.

In S4600b in FIG. 22, posture state estimation section 160b performs matching between the learned likelihood map and the estimated likelihood map, and then performs matching between the learned irregularity map and the estimated irregularity map. Then, posture state estimation section 160b determines whether or not the estimated likelihood map matches with any learned likelihood map, similarly to Embodiment 1.

More specifically, in the case where the value of the likelihood of the irregularity map is binary, posture stale estimation section 160b evaluates, for each pixel, the level of match in likelihood between the estimated irregularity map and the learned irregularity map. For example, posture state estimation section 160b counts, for every pixel, pixels having the same ID, and determines a learned irregularity map having the largest count value, as a map having a high level of match with the estimated irregularity map. Note that, similarly to the likelihood map, in the case where the size is different, posture state estimation section 160b may first enlarge or reduce the image region and then perform matching.

As described in FIG. 21, posture states having the same learned likelihood map but different learned irregularity maps can exist. Accordingly, more accurate posture state estimation is possible by performing not only matching with the learned likelihood map but also matching with the learned irregularity map.

As described above, because posture state estimation apparatus 100b according to the present embodiment generates the irregularity map and uses matching with the irregularity map in combination, the accuracy of posture estimation can be further improved.

Note that the present embodiment may be applied to posture state estimation apparatus 100a according to Embodiment 2. That is, the learned irregularity map may be generated similarly to the learned likelihood map generation.

The disclosure of the specification, drawings, and abstract included in Japanese Patent Application No. 2010-274673 filed on Dec. 9, 2010, is incorporated herein by reference in its entirety.

INDUSTRIAL APPLICABILITY

A posture state estimation apparatus and a posture state estimation method according to the present invention are useful in that the apparatus and method are each capable of accurately estimating the posture state of an object having joints.

REFERENCE SIGNS LIST 100, 100a, 100b Posture state estimation apparatus
110 Posture state management section
120 Posture state designation section
130 Image data acquisition section
140 Part region estimation section
145b Irregularity map estimation section
150, 150a Likelihood map generation section
160, 160b Posture state estimation section
200 Monocular camera
300 Information output apparatus

The invention claimed is:

1. A posture state estimation apparatus that estimates a posture state of a person on a basis of image data obtained by capturing the person, the person being an object including a plurality of parts articulated by joints, the posture state estimation apparatus comprising:
   a part region estimation section that detects positions of a head and shoulders of the person from the image data, and estimates a range of motion of each of at least two of the plurality of parts in the image data as a part region of each part on a basis of the detected positions;
   a likelihood map generation section that calculates, for each pixel or each group of pixels in the part region corresponding to each of at least the two parts, a likelihood value indicating likelihood that the part is located thereat by determining an image feature of the pixel or the group of pixels from the image data, and generates, for each of at least the two parts, a likelihood map indicating a distribution of the calculated likelihood values; and
   a posture state estimation section that estimates, if a level of match between a learned likelihood map and an estimated likelihood map is high, the posture state associated with the learned likelihood map as the posture state of the person, the learned likelihood map being the likelihood map associated in advance with the posture state, the estimated likelihood map being the likelihood map generated on the basis of the image data, wherein
   the likelihood map generation section generates the likelihood map on a basis of parallel lines in the image data, and
   the posture state estimation section computes the level of match using a main edge direction of the estimated likelihood map acquired from the parallel lines and a main edge direction of the learned likelihood map.

2. The posture state estimation apparatus according to claim 1, wherein
   the likelihood map generation section generates the estimated likelihood map where, for regions other than the part region, the likelihood that each part corresponding to the part region is located thereat is set low.

3. The posture state estimation apparatus according to claim 1, further comprising a posture state designation section that receives designation of the posture state as the estimation target, wherein
the posture state estimation section reports an estimation result that the posture state of the person is the designated posture state, if the level of match between the learned likelihood map associated with the posture state designated as the estimation target and the estimated likelihood map is high.

4. The posture state estimation apparatus according to claim 3, wherein
the posture state designation section receives an instruction to generate the learned likelihood map and designation of the posture state as the generation target,
the likelihood map generation section generates the learned likelihood map on a basis of a predetermined image if the instruction to generate the learned likelihood map is given, and
the posture state estimation apparatus further comprises a posture state management section that stores the generated learned likelihood map in association with the designated posture state.

5. The posture state estimation apparatus according to claim 1, further comprising an irregularity map estimation section that generates an irregularity map in which a surface of a subject in an image of the image data is divided according to irregularities thereof, wherein the posture state estimation section estimates the posture state of the person on a basis of a level of match between a learned irregularity map that is the irregularity map associated in advance with the posture state and an estimated likelihood map that is the irregularity map generated on the basis of the image data.

6. A posture state estimation method that estimates a posture state of a person on a basis of image data obtained by capturing the person, the person being an object including a plurality of parts articulated by joints, the method comprising:
detecting, by a part region estimation section, positions of a head and shoulders of the person from the image data, and estimating a range of motion of each of at least two of the plurality of parts in the image data as a part region of each part on a basis of the detected positions;
calculating, by a likelihood map generation section, for each pixel or each group of pixels in the part region corresponding to each of at least the two parts, a likelihood value indicating likelihood that the part is located thereat by determining an image feature of the pixel or the group of pixels from the image data;
generating, by the likelihood map generation section, for each of at least the two parts, a likelihood map indicating a distribution of the calculated likelihood values; and
estimating, by a posture state estimation section, if a level of match between a learned likelihood map and an estimated likelihood map is high, the posture state associated with the learned likelihood map as the posture state of the person, the learned likelihood map being the likelihood map associated in advance with the posture state, the estimated likelihood map being the likelihood map generated on the basis of the image data, wherein
the generating by the likelihood map generation section generates the likelihood map on a basis of parallel lines in the image data, and
the estimating by the posture state estimation section computes the level of match using a main edge direction of the estimated likelihood map acquired from the parallel lines and a main edge direction of the learned likelihood map.

* * * * *